United States Patent [19]
Takanashi

[11] Patent Number: 5,247,385
[45] Date of Patent: Sep. 21, 1993

[54] Fθ LENS AND LENS FOR FORMING LINEAR IMAGE

[75] Inventor: Kenichi Takanashi, Chiba, Japan

[73] Assignee: Ricoh Company, Ltd., Tokyo, Japan

[21] Appl. No.: 8,222

[22] Filed: Jan. 22, 1993

Related U.S. Application Data

[63] Continuation of Ser. No. 631,456, Dec. 21, 1990, abandoned.

[30] Foreign Application Priority Data

| Jan. 25, 1990 | [JP] | Japan | 2-15635 |
| Jun. 21, 1990 | [JP] | Japan | 2-163698 |
| Jul. 30, 1990 | [JP] | Japan | 2-201880 |
| Oct. 16, 1990 | [JP] | Japan | 2-276746 |

[51] Int. Cl.$^5$ .......................... G02B 26/08; G02B 3/00
[52] U.S. Cl. .................................. 359/205; 359/206; 359/662
[58] Field of Search ..................... 359/196–226, 359/662, 663

[56] References Cited

U.S. PATENT DOCUMENTS

| 4,818,046 | 4/1989 | Kondo | 359/218 |
| 4,836,630 | 6/1989 | Takanashi | 359/218 |
| 4,859,011 | 8/1989 | Takanashi | 359/218 |
| 4,863,250 | 9/1989 | Ishizuka | 359/662 |
| 4,925,279 | 5/1990 | Shirota | 359/206 |
| 4,932,734 | 6/1990 | Sakuma et al. | 359/217 |
| 5,064,261 | 11/1991 | Itabashi | 359/206 |

FOREIGN PATENT DOCUMENTS 59-7918  1/1984  Japan.

*Primary Examiner*—Bruce Y. Arnold
*Assistant Examiner*—Thong Nguyen
*Attorney, Agent, or Firm*—Fish & Richardson

[57] ABSTRACT

In an optical scanner, a light beam emitted from a semiconductor laser is changed to a parallel light beam by a collimator lens and the parallel light beam is formed by a first optical system as a linear image extending in a main scan-corresponding direction. The image-formed parallel light beam is deflected at an equal angular velocity by a rotary polygon mirror having a deflection reflecting face in the vicinity of the linear image. The deflected light beam is formed as a light spot on a scanned face by a second optical system to perform an optical scanning operation. An fθ lens in the optical scanner is used as the second optical system. The fθ lens has an fθ function in the main scan-corresponding direction and a function for setting the scanned face and a deflecting start point on the deflection reflecting face in an approximately conjugate relation in geometrical optics in a cross scan-corresponding direction. The fθ lens has a first lens having a concave spherical face on an object side of the fθ lens and a cylindrical face on an image side of the fθ lens; a second lens having a concave spherical face on the object side and a convex spherical face on the image side; and a third lens having a flat face on the object side and a toric face on the image side. The fθ lens may be constructed by two lenses.

2 Claims, 22 Drawing Sheets

$r_{1M} = r_{1S}, \quad r_{2M} = \infty, \quad r_{3M} = \infty, \quad |r_{4M}| > |r_{4S}|$

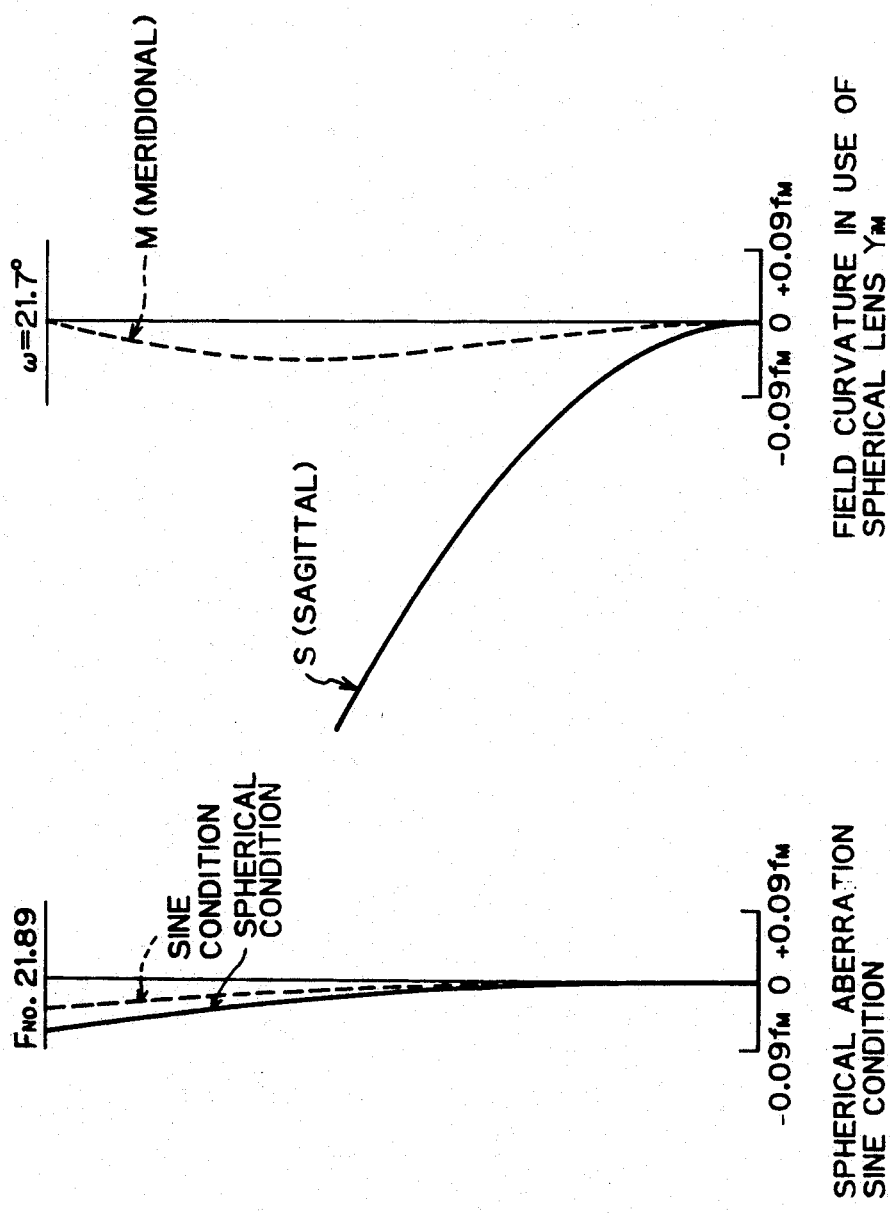
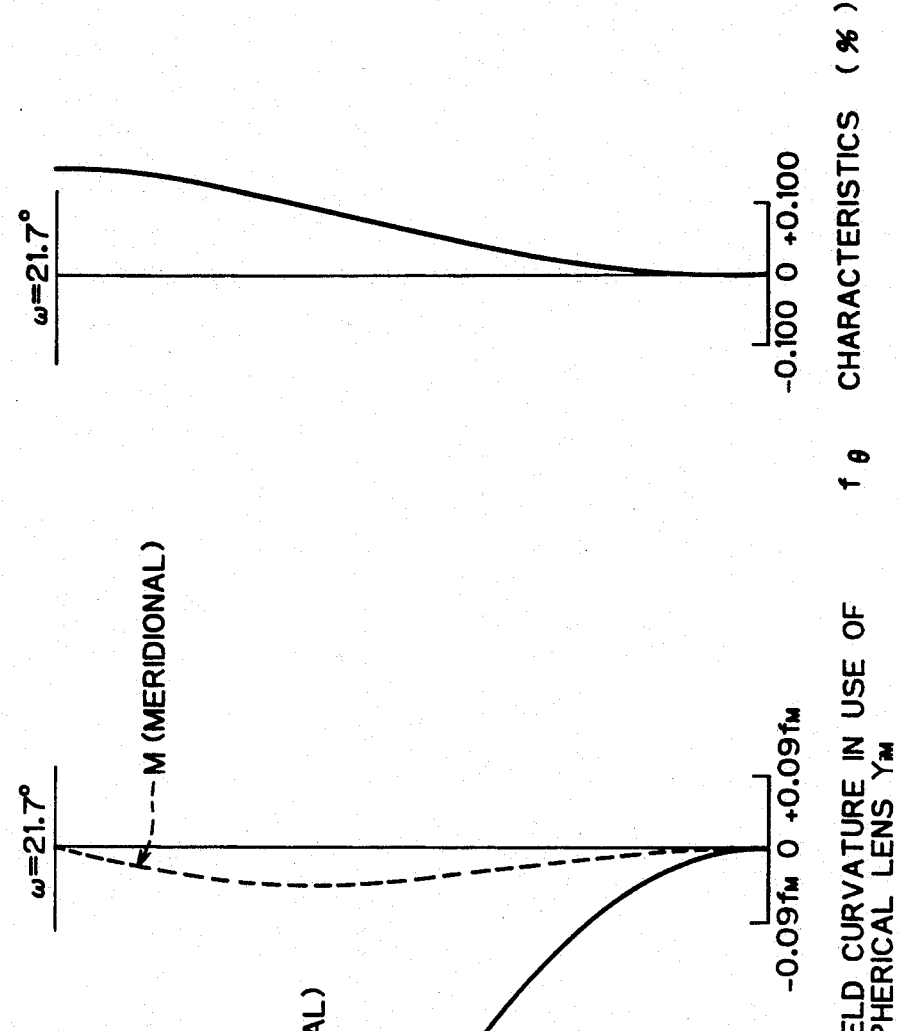
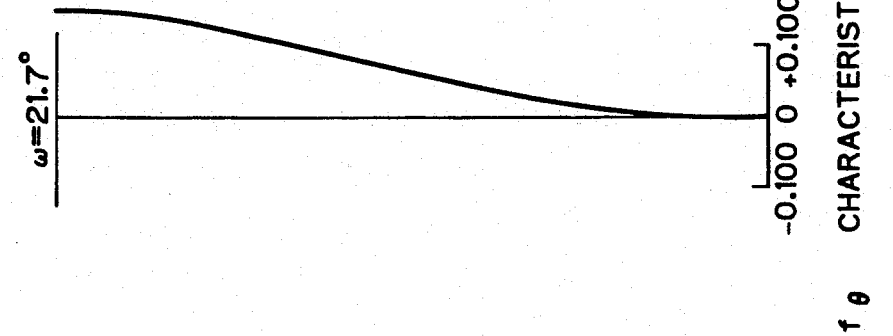

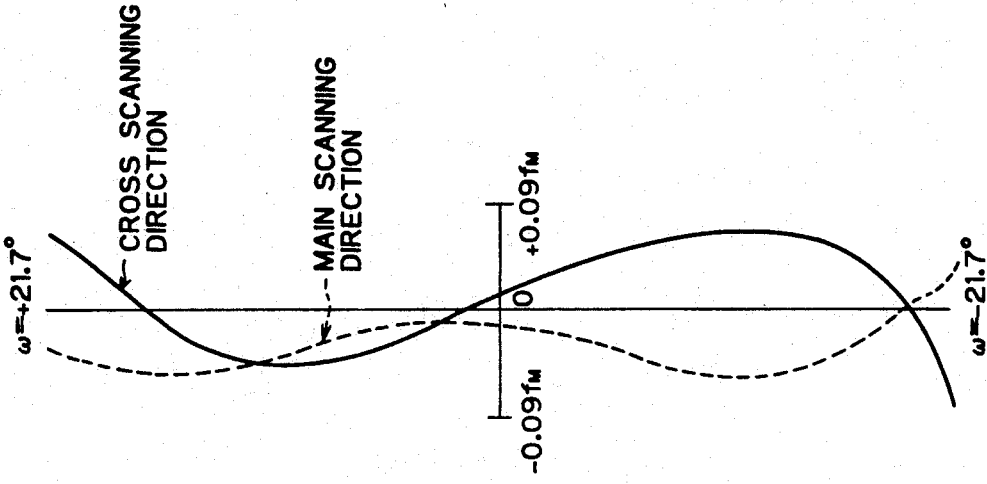
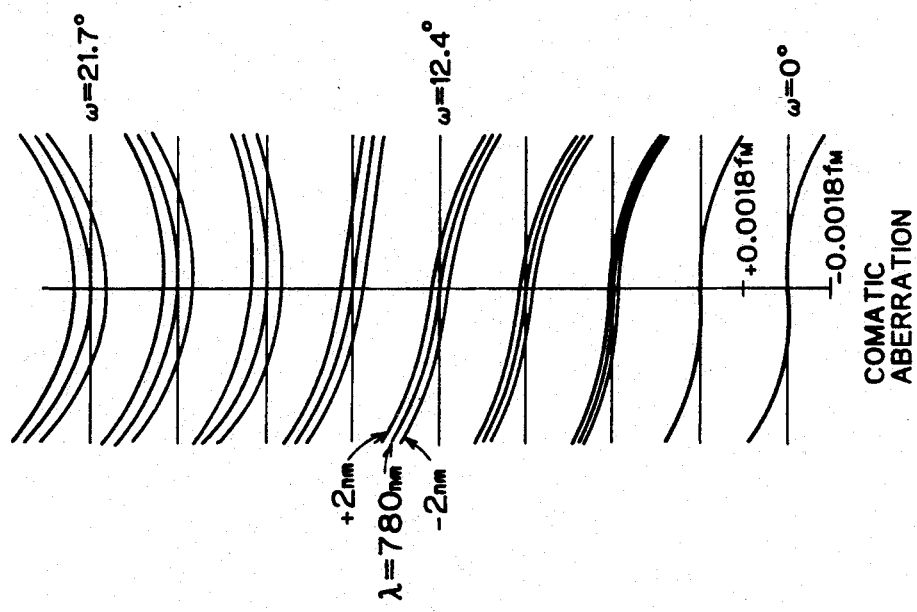

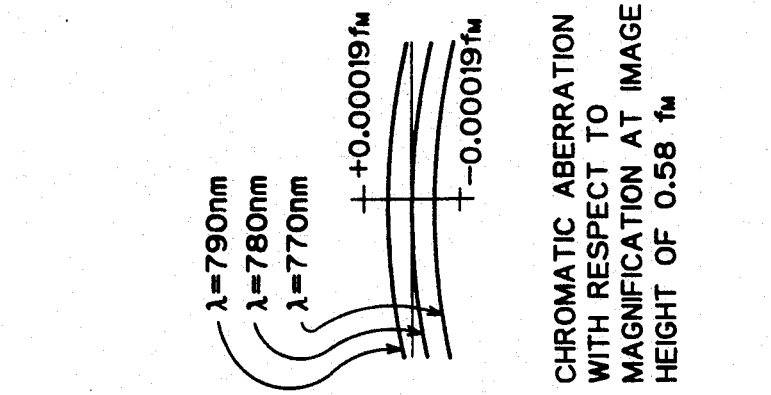
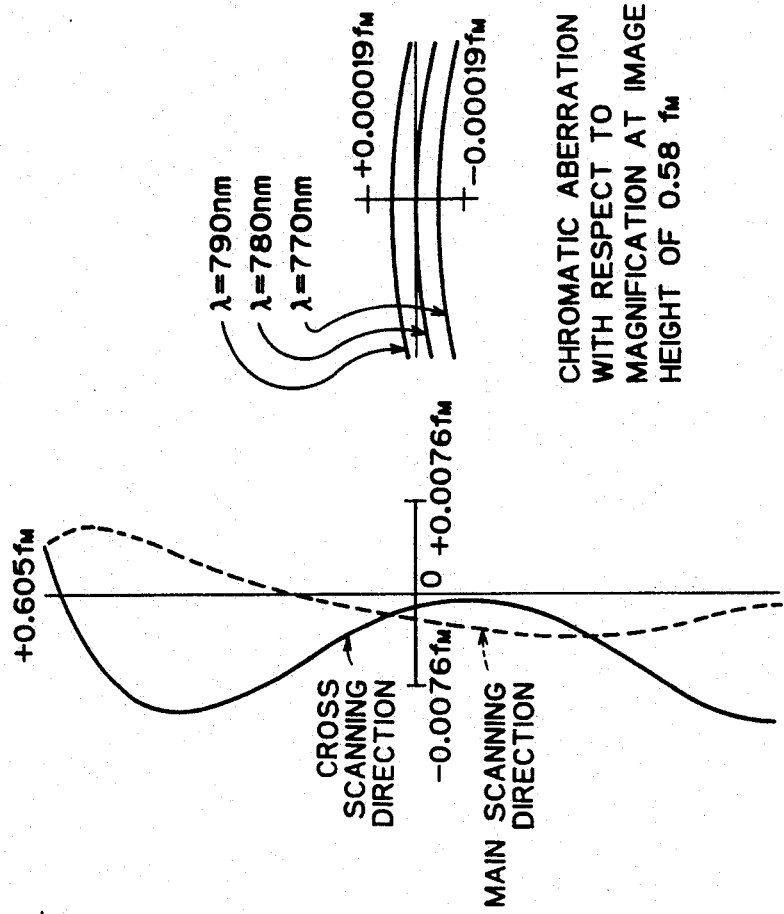
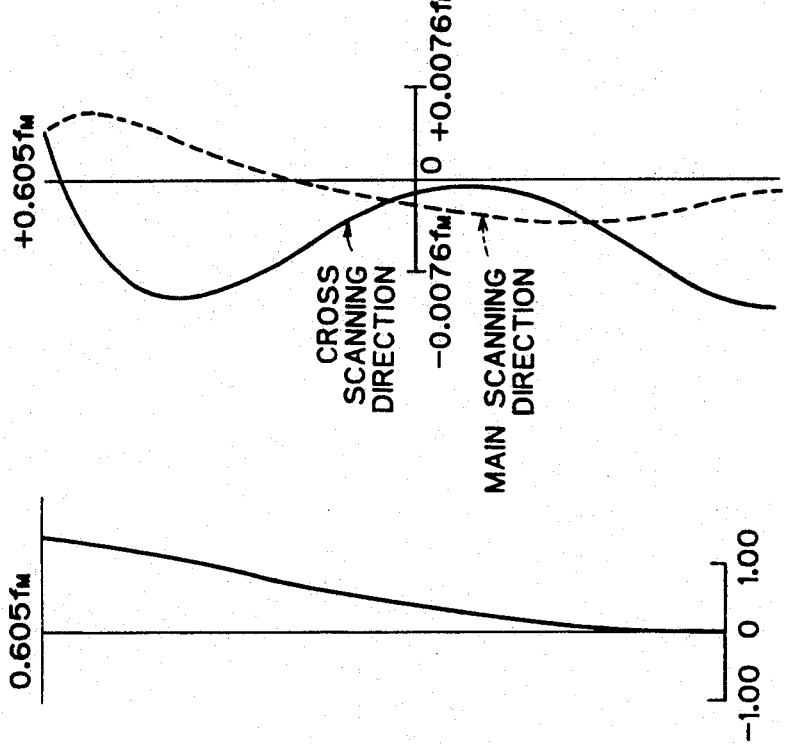
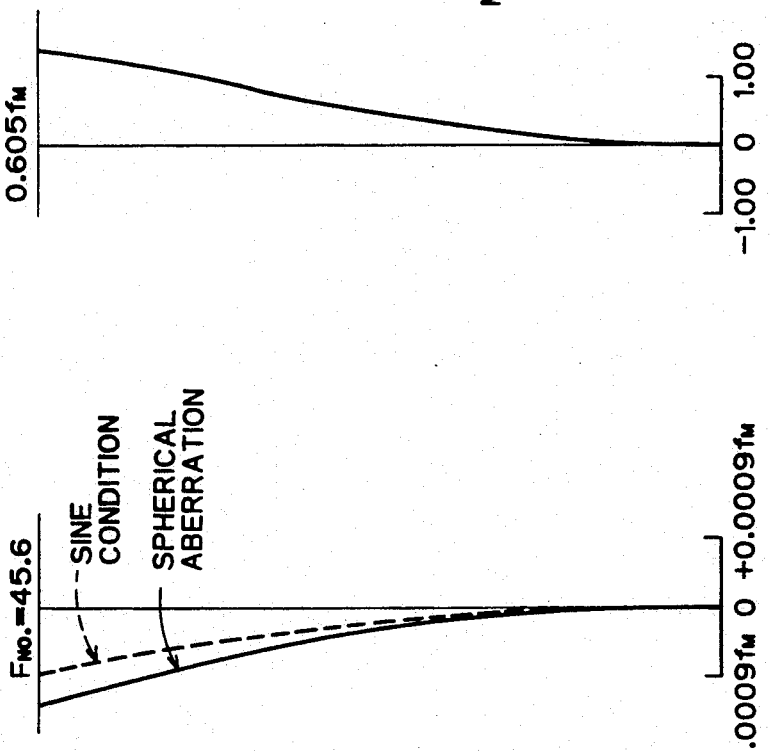

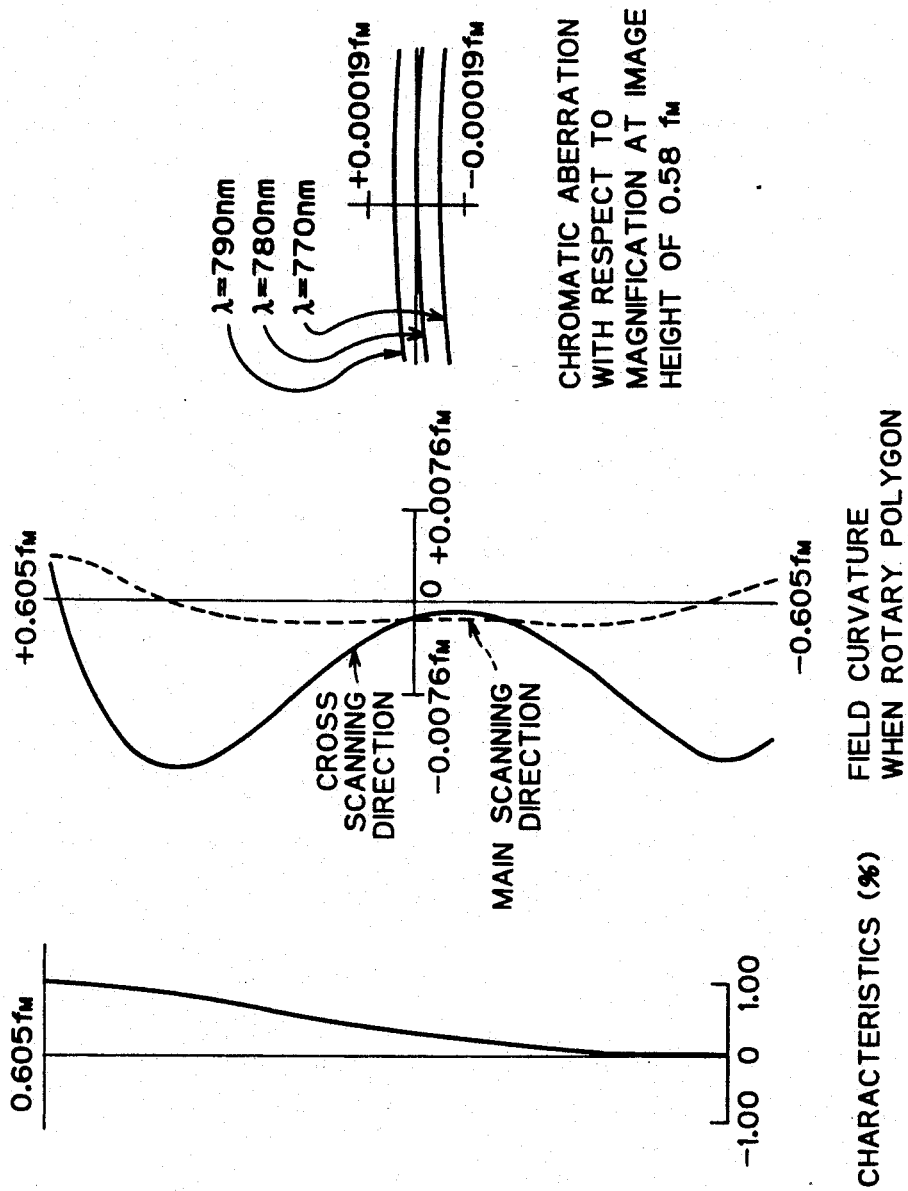

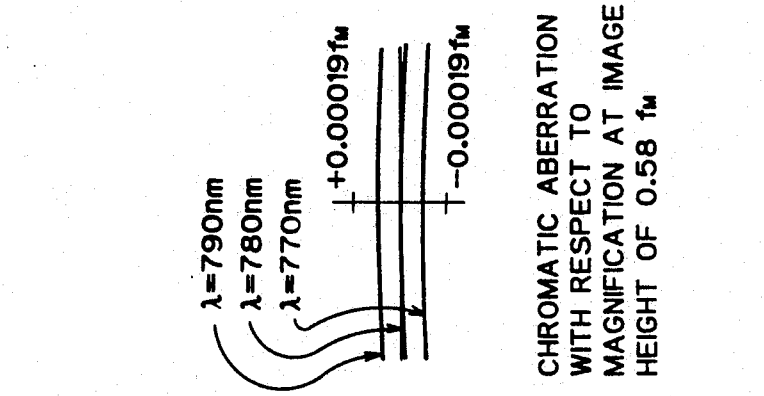
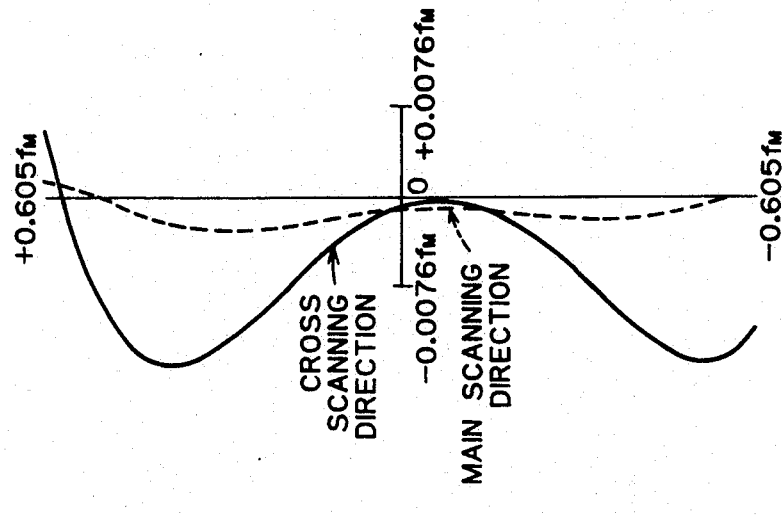
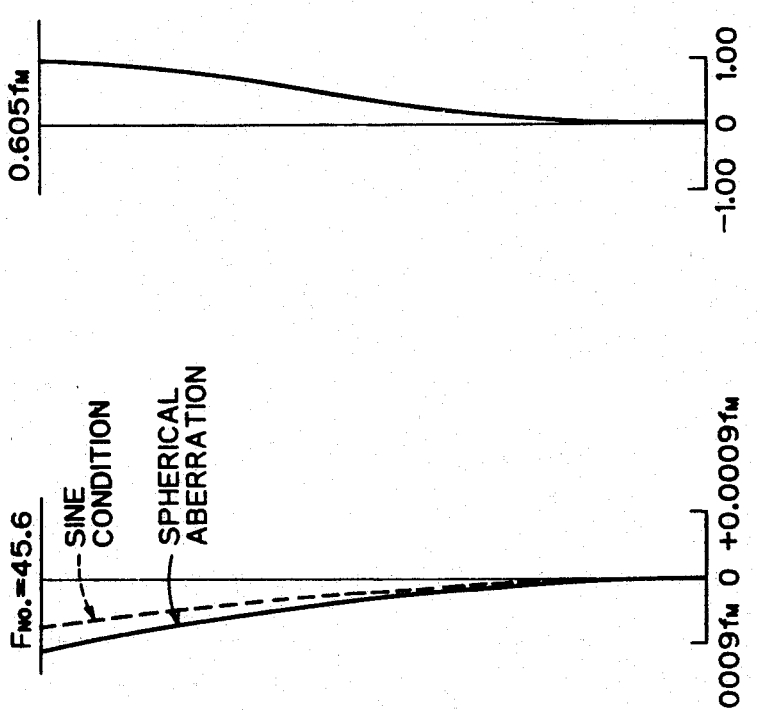

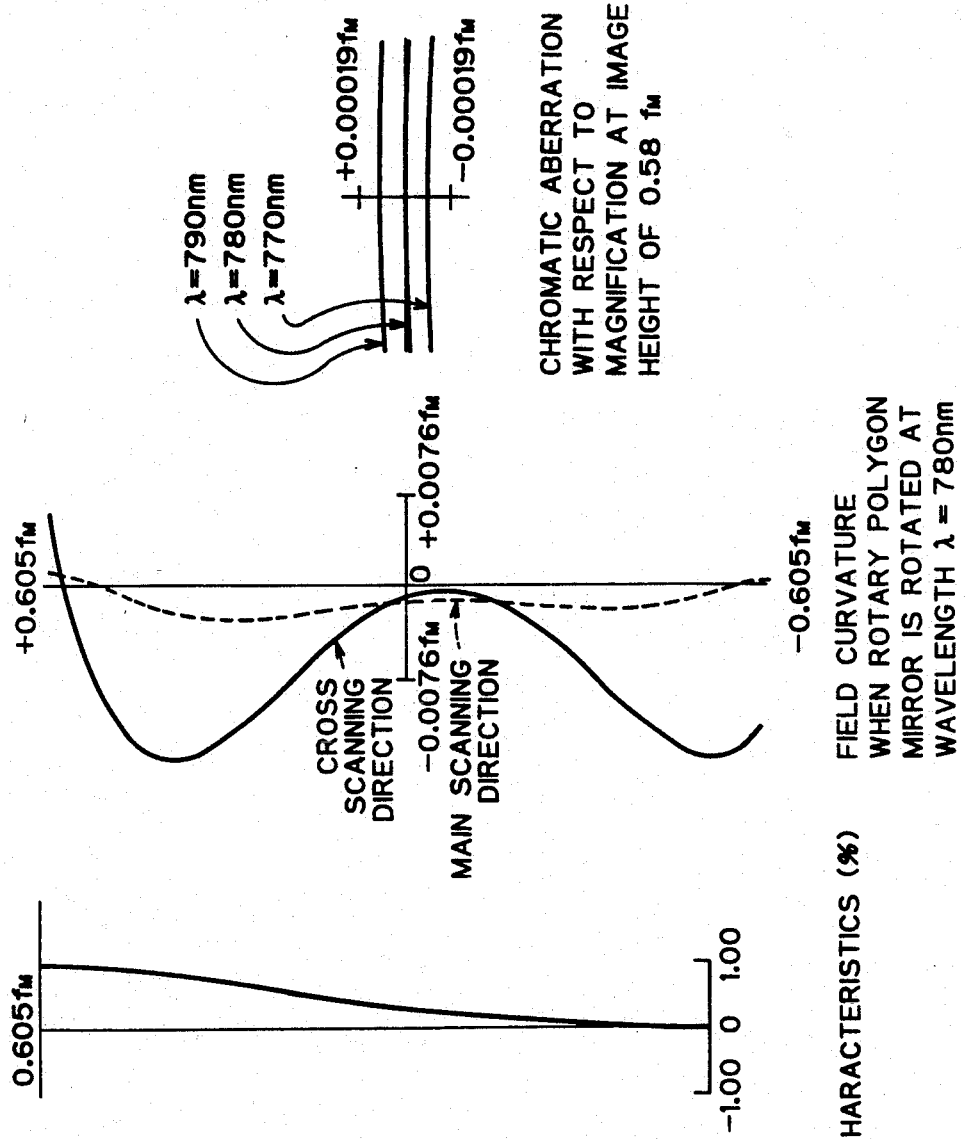

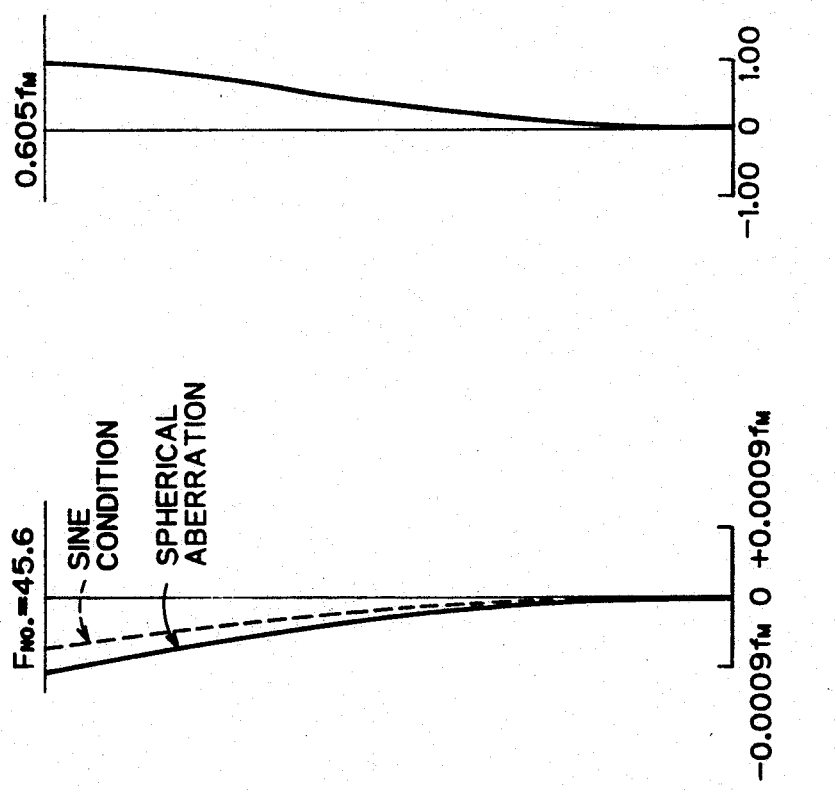

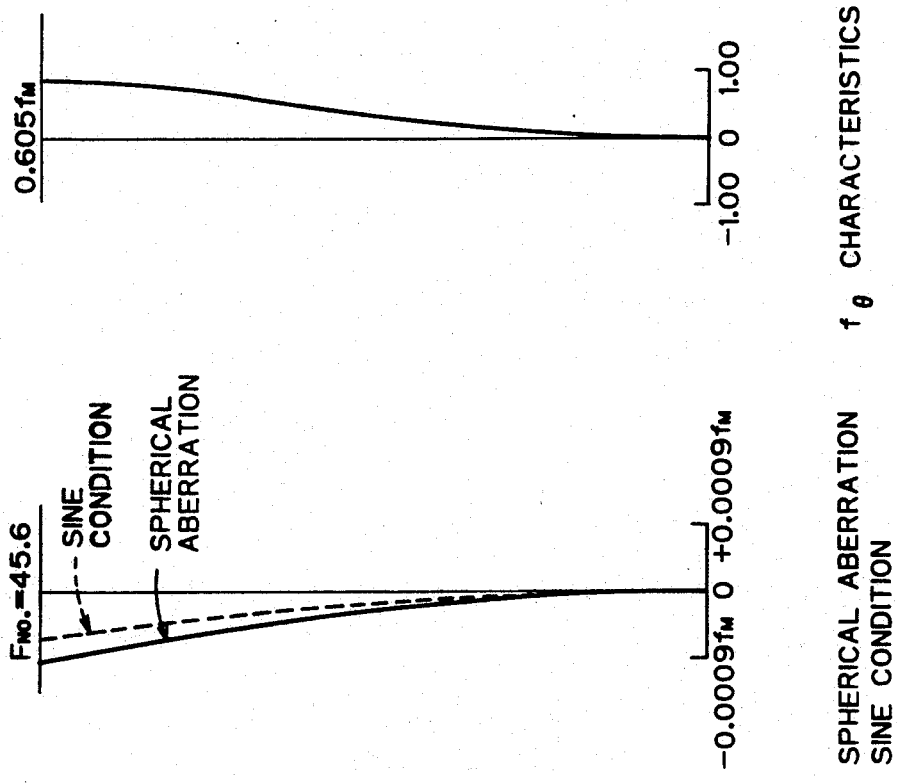
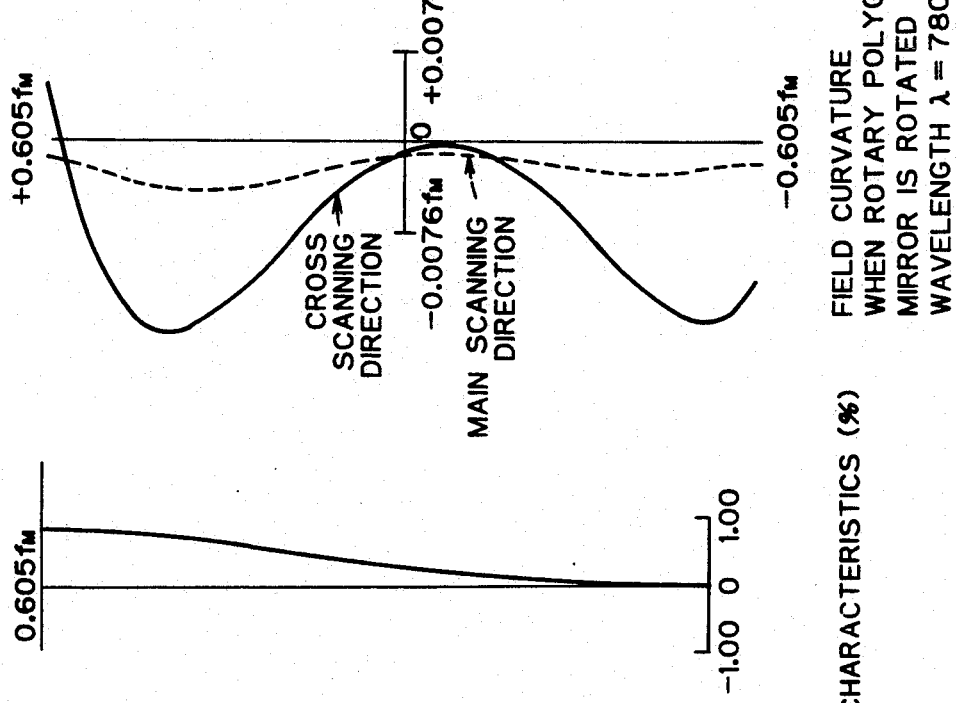
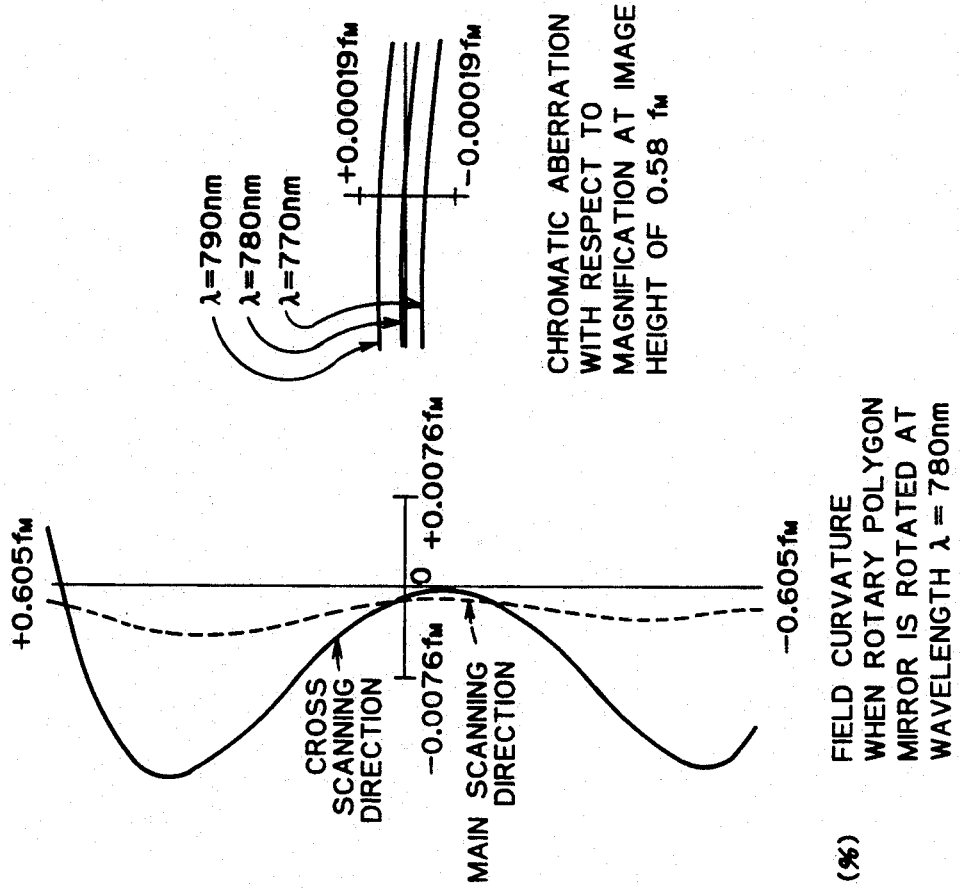

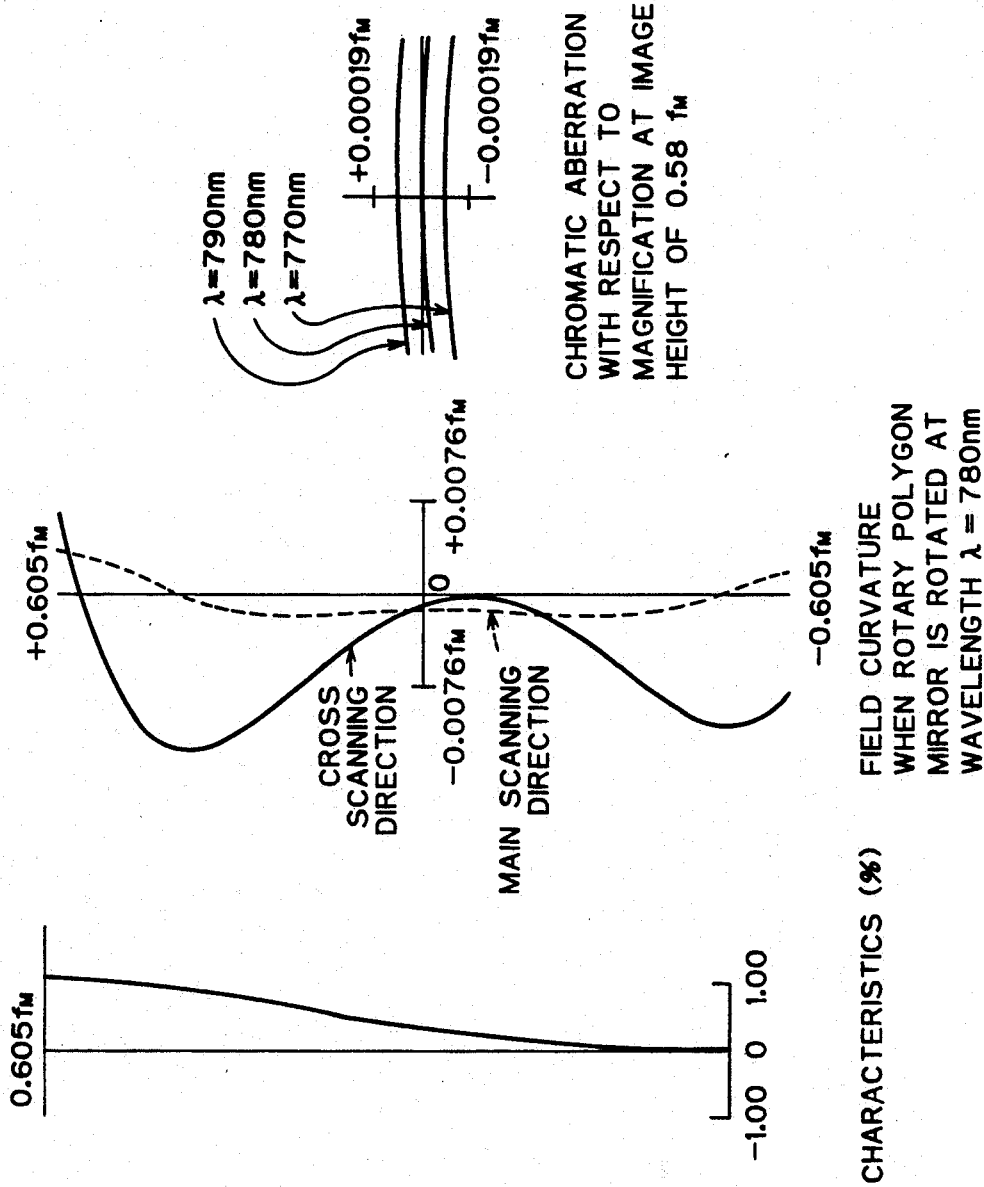

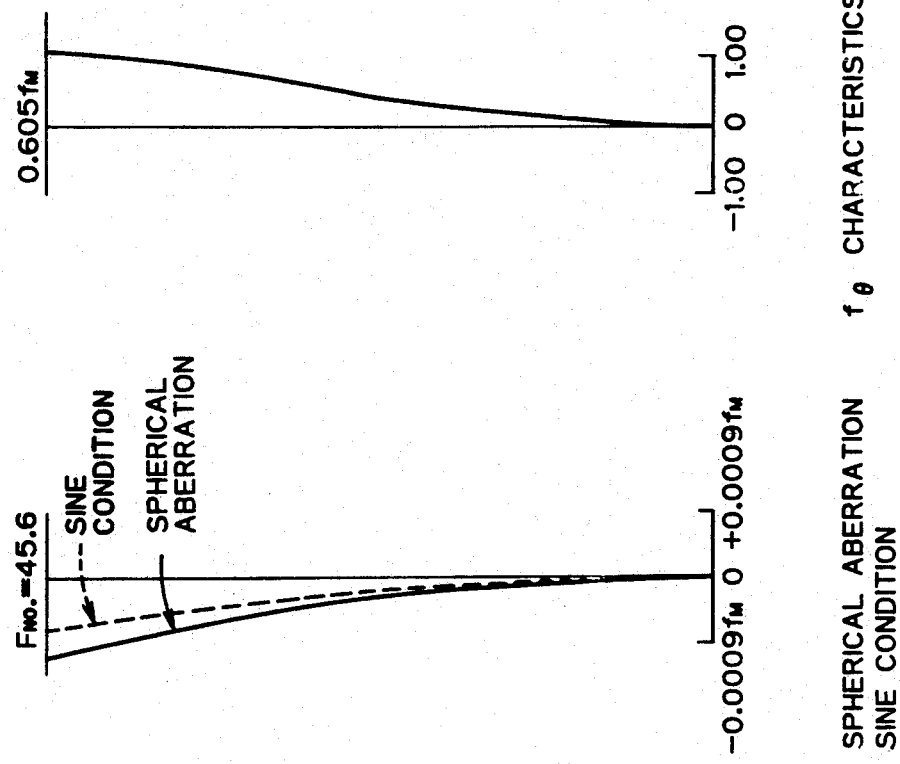

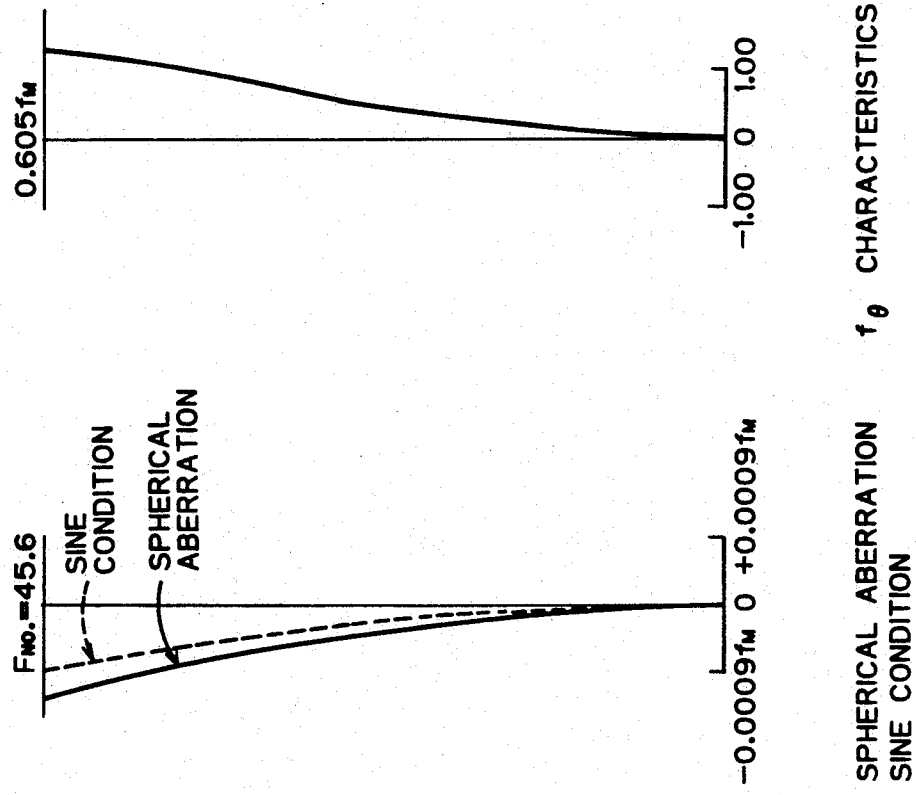

SPHERICAL ABERRATION SINE CONDITION $f_\theta$ CHARACTERISTICS (%)

FIELD CURVATURE WHEN ROTARY POLYGON MIRROR IS ROTATED AT WAVELENGTH $\lambda = 780$ nm CHROMATIC ABERRATION WITH RESPECT TO MAGNIFICATION AT IMAGE HEIGHT OF 0.58 $f_M$

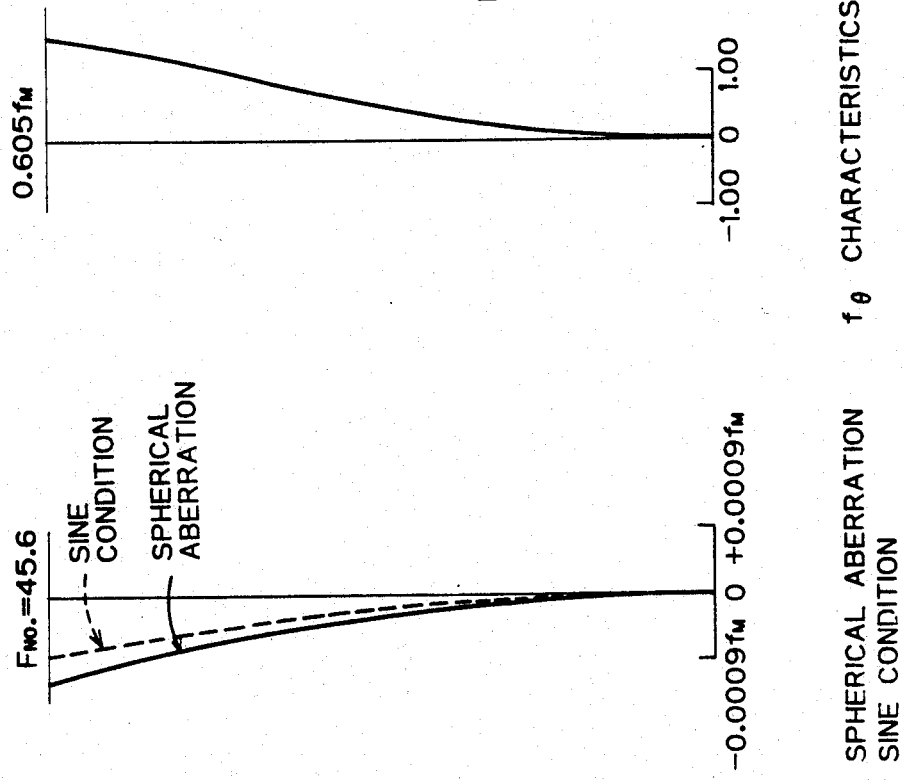

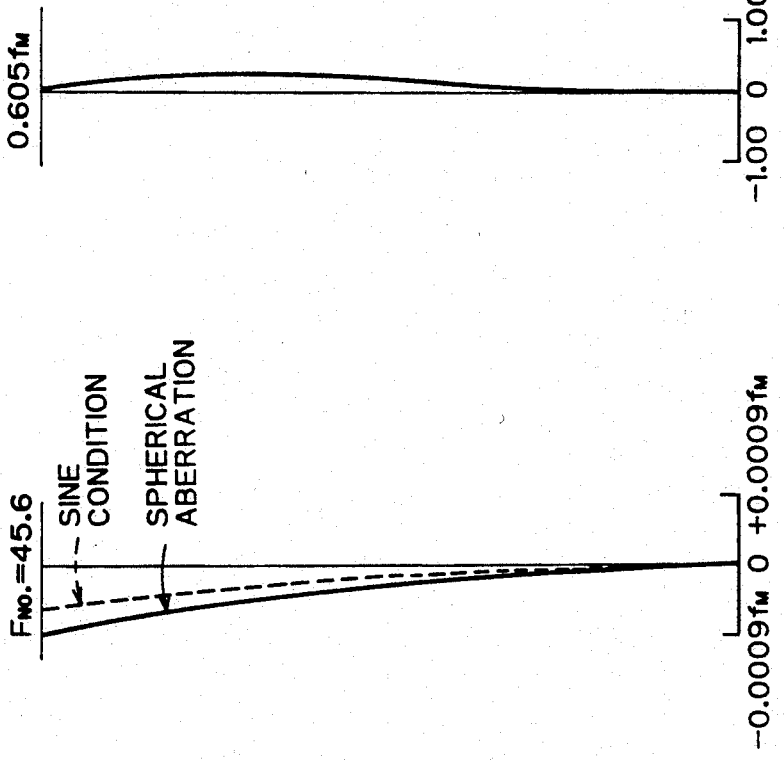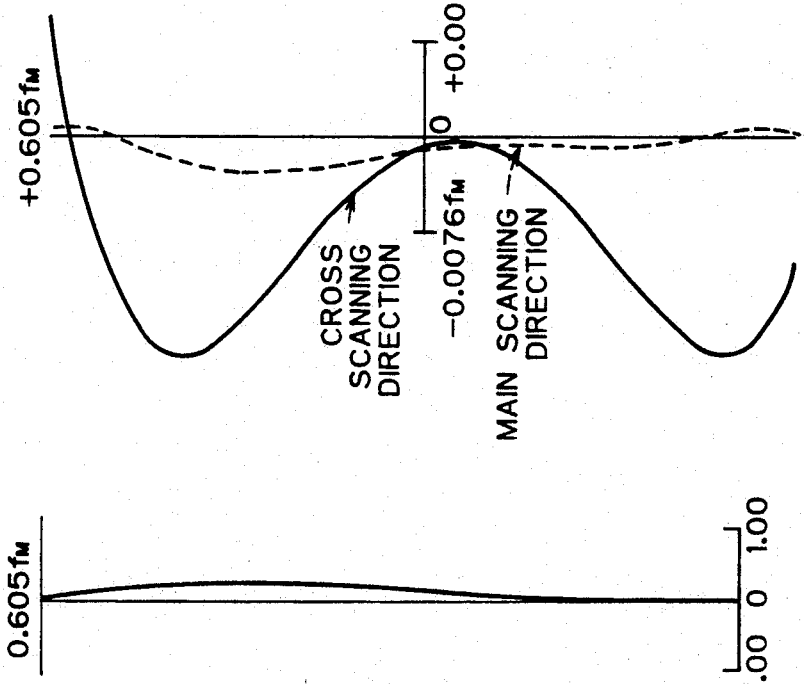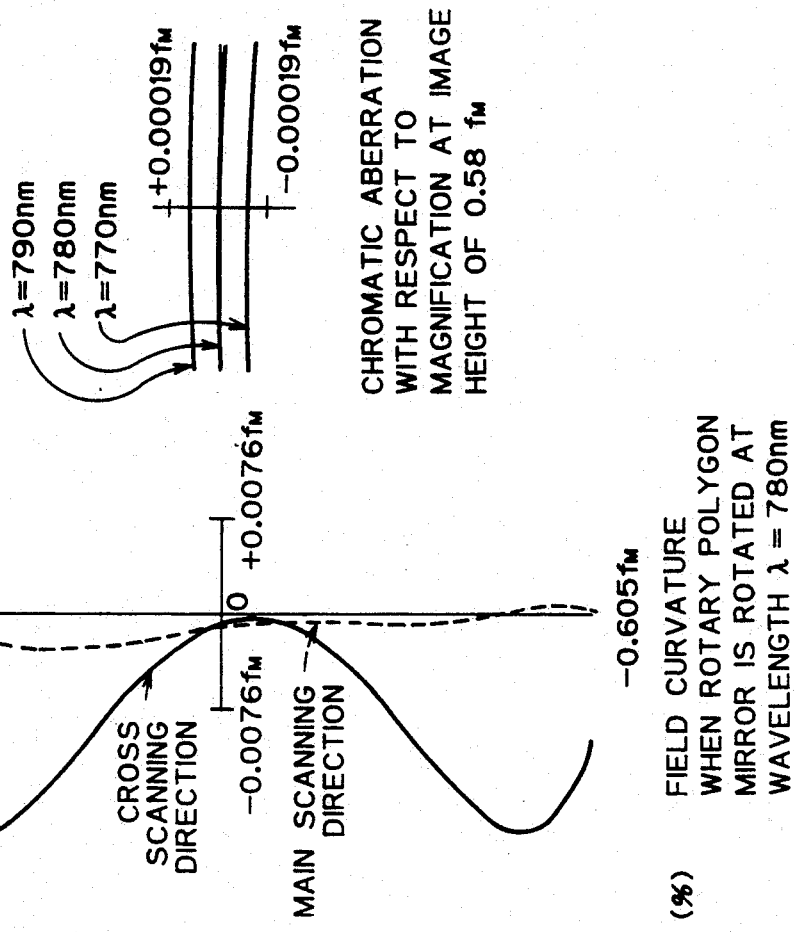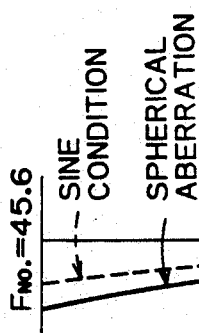

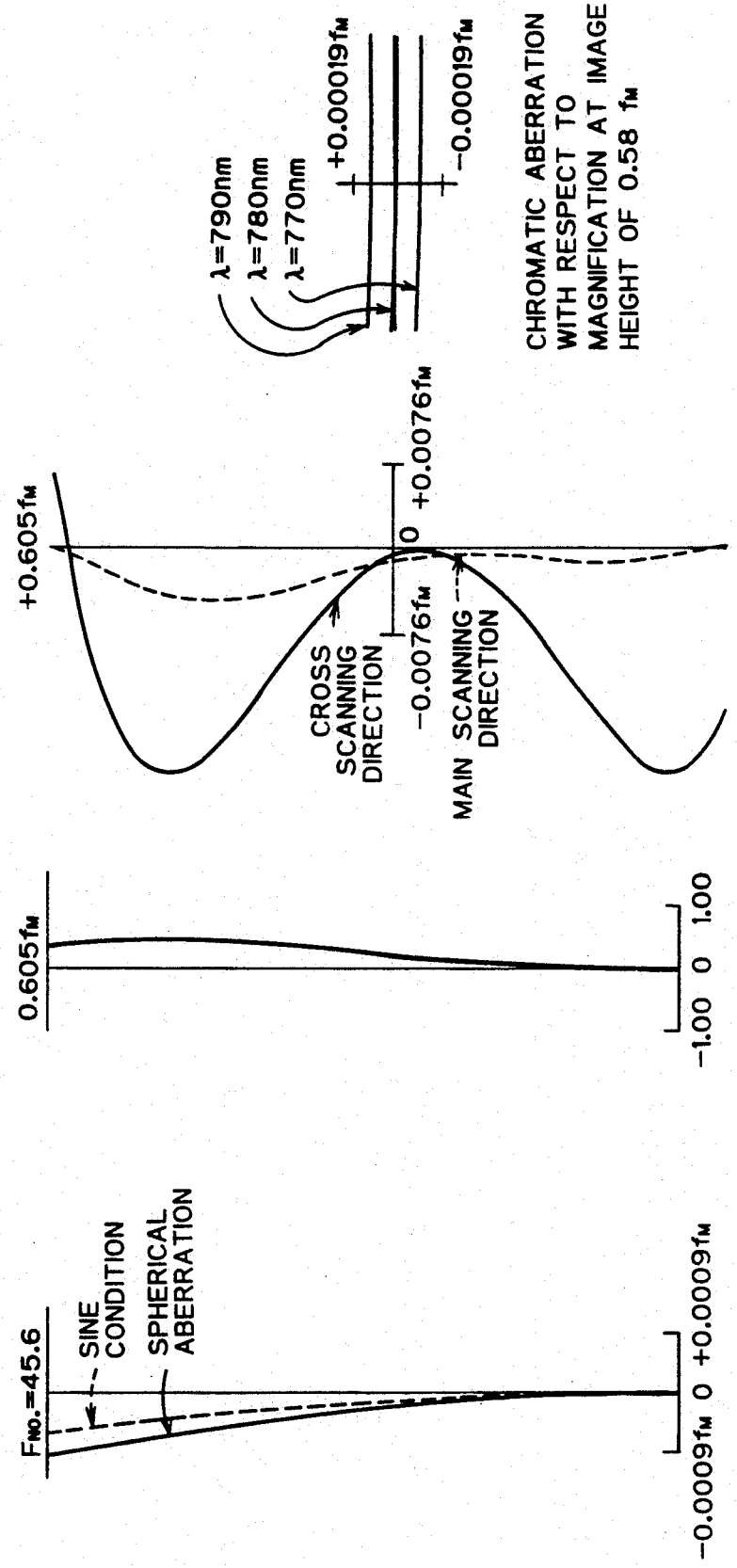

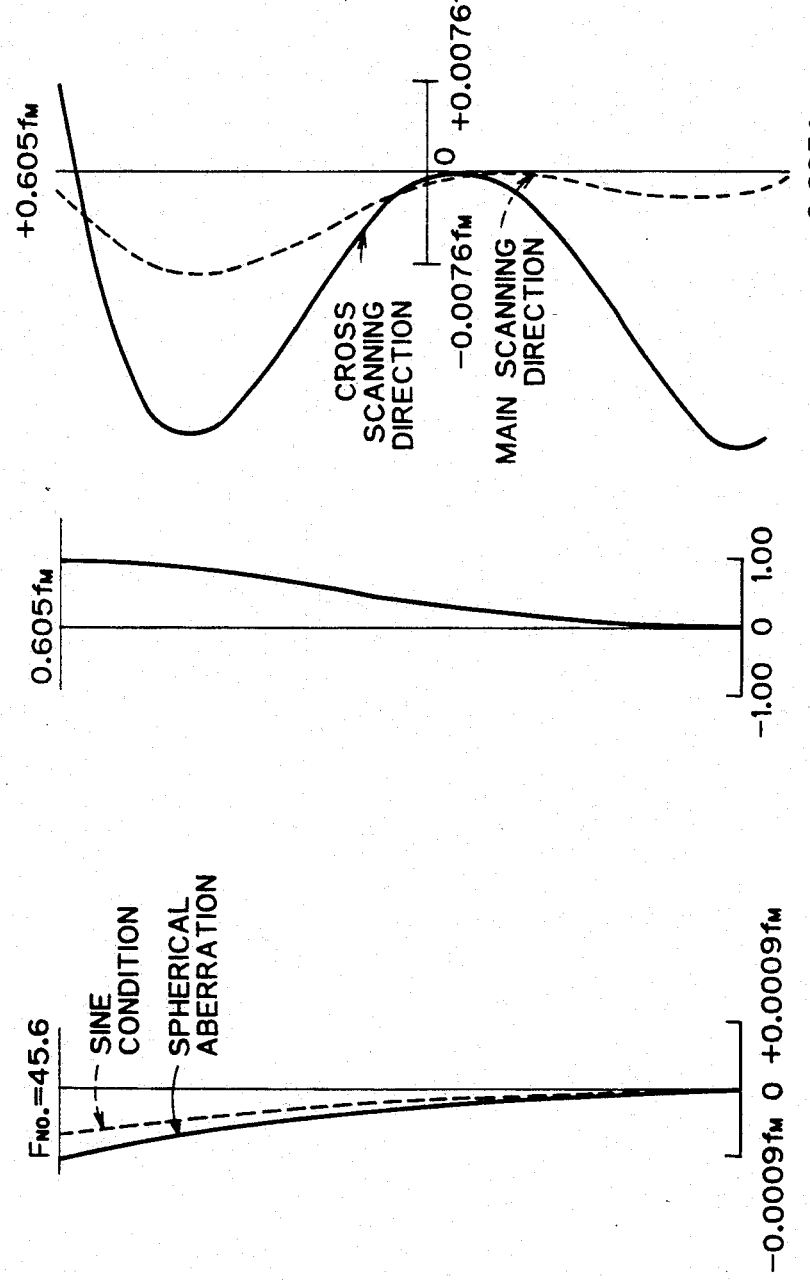
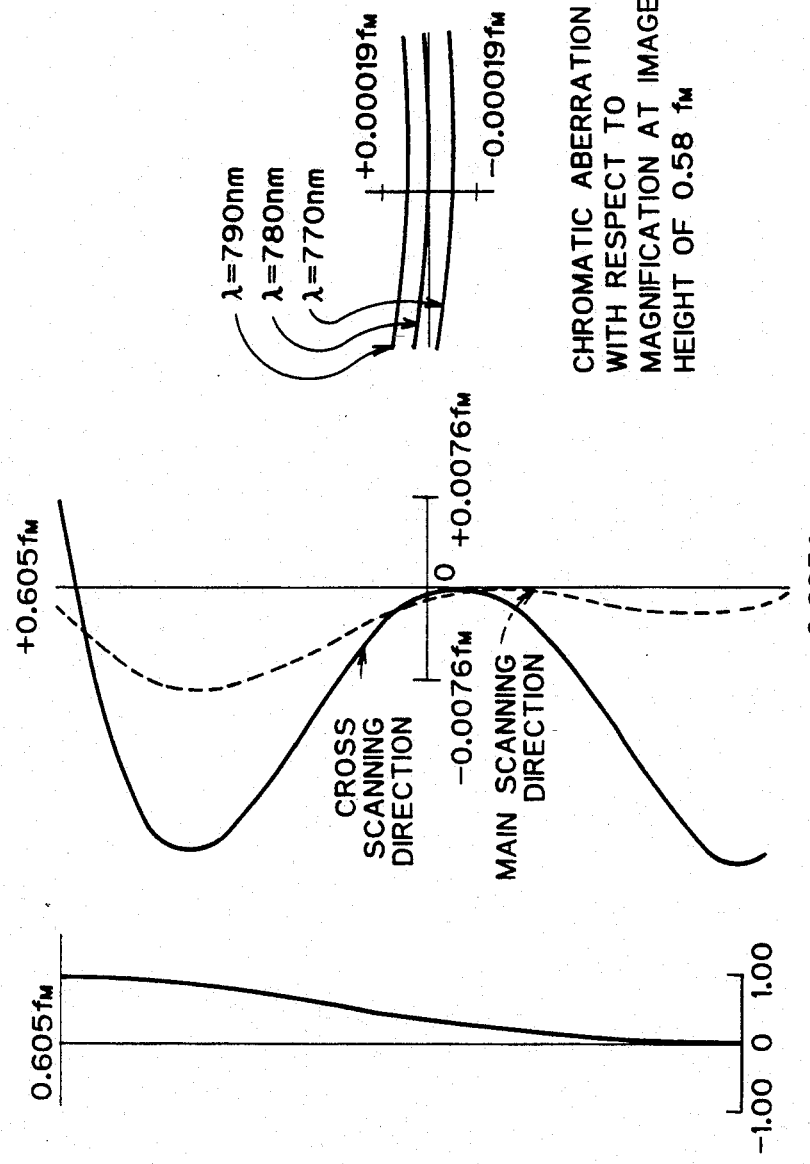
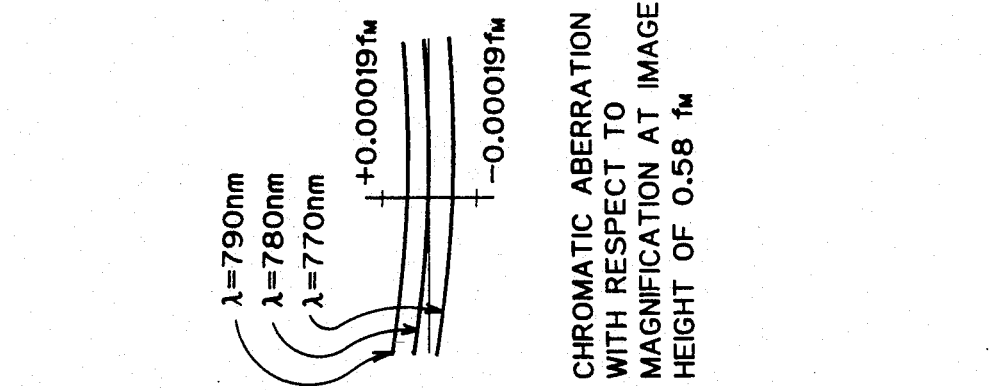

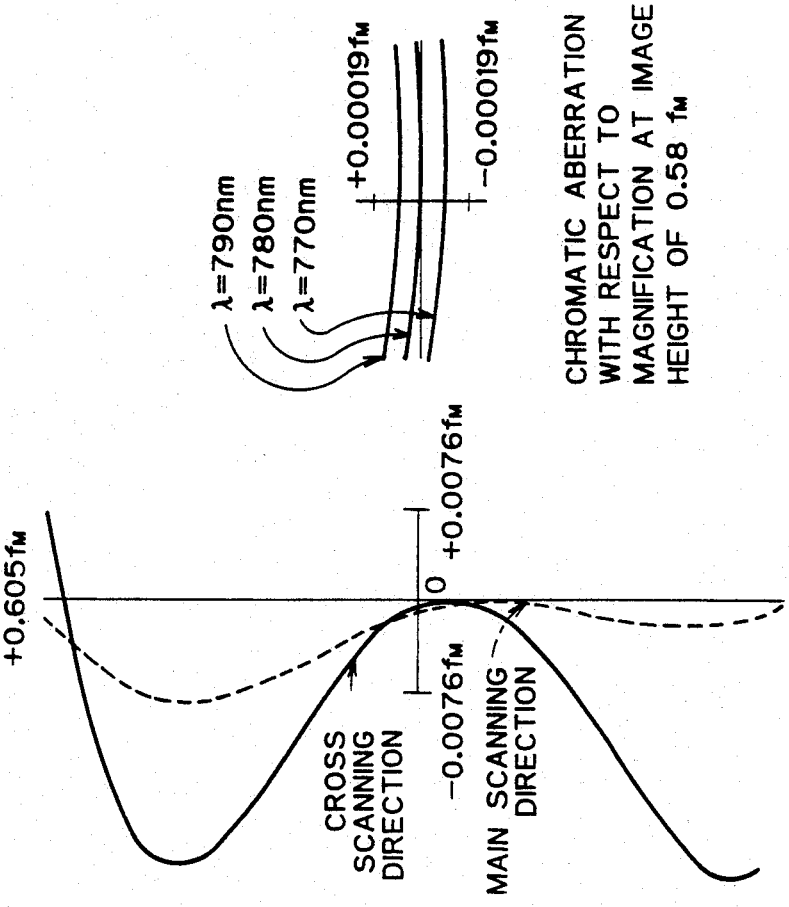
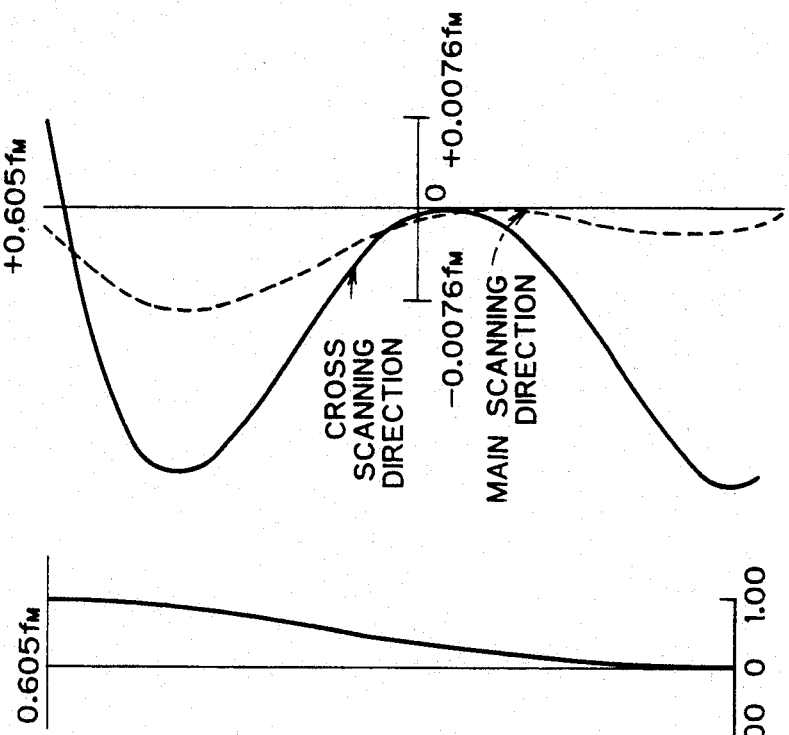
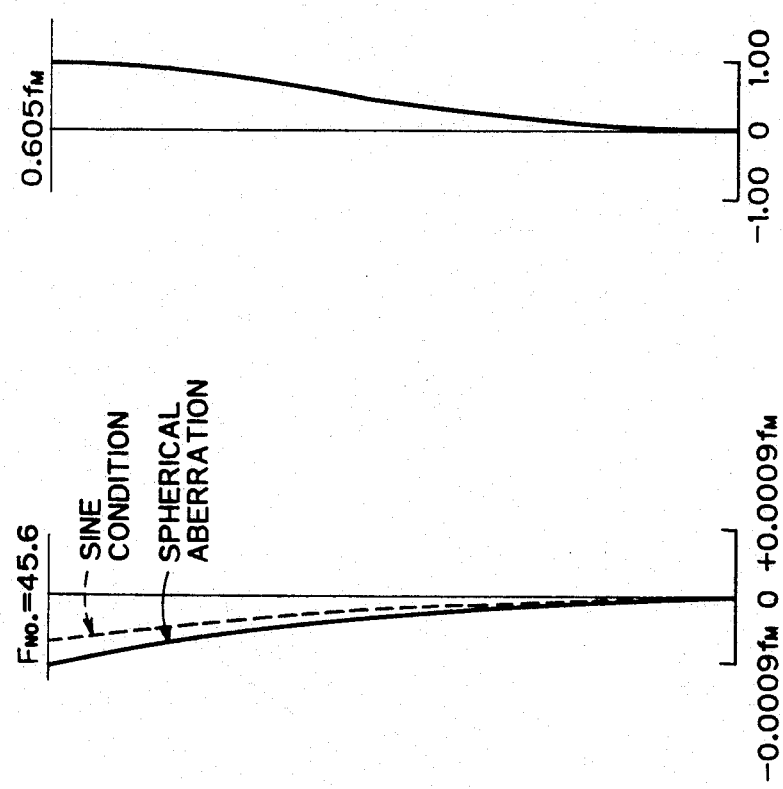

Fθ LENS AND LENS FOR FORMING LINEAR IMAGE

This application is a continuation of U.S. application Ser. No. 07/631,456 filed Dec. 21, 1990, now abandoned.

BACKGROUND OF THE INVENTION

1. Field of the Invention

The present invention relates to an fθ lens using a rotary polygon mirror and a lens for forming a linear image and using a rotary polygon mirror.

2. Description of the Related Art

In a known optical scanner, a light beam is emitted from a semiconductor laser and is changed to a parallel light beam by a collimator lens. This parallel light beam is formed by a first image forming optical system as a linear image extending in a main scan-corresponding direction. This linear image is deflected at an equal angular velocity by a rotary polygon mirror having a deflection reflecting face in the vicinity of the linear image. The deflected light beam is formed as a light spot on a scanned face by a second image forming optical system so as to perform an optical scanning operation. An fθ lens is used as the second image forming optical system in such an optical scanner. The fθ lens has a function for providing an equal moving speed of the light spot on the scanned face. The fθ lens also has a function for correcting an inclination of the reflecting face of the rotary polygon mirror.

In the above optical scanner, the semiconductor laser as a light source is heated by a driving electric current flowing therethrough so that the temperature of the semiconductor laser is changed. In this case, a luminous wavelength of the semiconductor laser is generally changed by ±2 nm by a so-called mode hop. Accordingly, when no chromatic aberration of the fθ lens with respect to magnification is corrected, a writing position of the optical scanner with respect to the light spot is shifted by the change in wavelength of the light beam emitted from the semiconductor laser, thereby causing a so-called jitter. Such a jitter has a serious bad influence upon the quality of a recording image provided by the optical scanning operation of high density.

Various kinds of fθ lenses for correcting the chromatic aberration with respect to magnification are known as shown in e.g., Japanese Patent Application Laying Open (KOKAI) No. 59-7918. However, such fθ lenses cannot correct the above inclination of a reflecting face of the rotary polygon mirror.

With respect to the entire optical scanner, to effectively correct the chromatic aberration of the fθ lens, it is preferable to further correct the chromatic aberration on an optical axis of the first image forming optical system for forming the parallel light beam from the light source as a linear image. When no chromatic aberration on the optical axis of the first image forming optical system is corrected, the position of the formed linear image is shifted from a designed position thereof when the luminous wavelength of the semiconductor laser is different from a designed wavelength. Accordingly, field curvature in a cross scanning direction is changed in accordance with the difference in wavelength even when the chromatic aberration of the fθ lens with respect to magnification is corrected. Therefore, the diameter of a light spot is changed in the cross scanning direction in accordance with an image height so that it is difficult to perform the optical scanning operation of high density.

SUMMARY OF THE INVENTION

It is therefore a first object of the present invention to provide a novel fθ lens for correcting the inclination of a reflecting face of a rotary polygon mirror and correcting chromatic aberration with respect to magnification.

A second object of the present invention is to provide a novel lens for forming a linear image in which the shift in position of the formed linear image is very small even when a luminous wavelength in a semiconductor laser is different from a designed wavelength.

The first object of the present invention can be achieved by an fθ lens in an optical scanner in which a light beam emitted from a semiconductor laser is changed to a parallel light beam by a collimator lens, the parallel light beam is formed by a first image forming optical system as a linear image extending in a main scan-corresponding direction, and the image-formed parallel light beam is then deflected at an equal angular velocity by a rotary polygon mirror having a deflection reflecting face in the vicinity of the linear image so that the deflected light beam is formed as a light spot on a scanned face by a second image forming optical system to perform an optical scanning operation, the fθ lens being used as the second image forming optical system; the fθ lens having an fθ function with respect to the main scan-corresponding direction and a function for setting the scanned face and a deflecting start point on the deflection reflecting face in an approximately conjugate relation in geometrical optics with respect to a cross scan-corresponding direction; the fθ lens comprising a first lens group constructed by a first lens having a concave spherical face on an object side of the fθ lens and a cylindrical face having negative refracting power in the cross scan-corresponding direction on an image side of the fθ lens; a second lens group constructed by a second lens having a concave spherical face on the object side and a convex spherical face on the image side; and a third lens group constructed by a third lens having a flat face on the object side and a toric face on the image side on which the refracting power of the toric face in the cross scan-corresponding direction is positive and stronger than the positive refracting power of the toric face in the main scan-corresponding direction; the first to third lens groups being sequentially arranged from the object side to the image side.

An Abbe number $\nu_{dj}$ of a j-th lens counted from the object side on a line d, focal lengths $f_{jM}$ and $f_{jS}$ of the j-th lens in the main and cross scan-corresponding directions, and a combined focal length $f_M$ of an entire lens system in the main scan-corresponding direction may satisfy the following conditions.

$$\nu_{d2} > 80 \tag{1-I}$$

$$f_M \cdot \Sigma\{1/(f_{jM} \cdot \nu_{dj})\} > -0.03 \tag{1-II}$$

$$f_{3S}/f_{1S} < -1.0 \tag{1-III}$$

The first object of the present invention can be also achieved by an fθ lens in an optical scanner in which a light beam emitted from a semiconductor laser is changed to a parallel light beam by a collimator lens, the parallel light beam is formed by a first image forming optical system as a linear image extending in a main scan-corresponding direction, and the image-formed parallel light beam is then deflected at an equal angular velocity by a rotary polygon mirror having a deflection reflecting face in the vicinity of the linear image so that the deflected light beam is formed as a light spot on a scanned face by a second image forming optical system to perform an optical scanning operation, the fθ lens being used as the second image forming optical system; the fθ lens having an fθ function with respect to the main scan-corresponding direction and a function for setting the scanned face and a deflecting start point on the deflection reflecting face in an approximately conjugate relation in geometrical optics with respect to a cross scan-corresponding direction; the fθ lens comprising a first lens group constructed by a first lens having a concave spherical face on an object side of the fθ lens and a cylindrical face having negative refracting power in the cross scan-corresponding direction on an image side of the fθ lens; and a second lens group constructed by a second lens having a cylindrical face having negative refracting power in the cross scan-corresponding direction on the object side and a convex toric face on the image side on which positive refracting power of the toric face in the cross scan-corresponding direction is stronger than that in the main scan-corresponding direction; the first and second lens groups being sequentially arranged from the object side to the image side.

An Abbe number $v_{dj}$ of a j-th lens counted from the object side on a line d, a focal length $f_{jM}$ of the j-th lens in the main scan-corresponding direction, and a combined focal length $f_M$ of an entire lens system in the main scan-corresponding direction, a distance D between principal points of the first and second lenses, and a radius $r_{iS}$ of curvature of an i-th lens face counted from the object side in the cross scan-corresponding direction may satisfy the following conditions.

$$0 < f_M \cdot \Sigma \{1/(f_{jM} \cdot v_{dj})\} < 9 \times 10^{-3} \quad \text{(3-I)}$$

$$v_{d1} < 40 \quad \text{(3-II)}$$

$$v_{d2} > 50 \quad \text{(3-III)}$$

$$1.3 < f_M/f_{2M} < 1.5 \quad \text{(3-IV)}$$

$$0.14 < D/f_M < 0.21 \quad \text{(3-V)}$$

$$|r_{2S}/r_{3S}| = 1 \quad \text{(3-VI)}$$

In accordance with the above two structures of the present invention, it is possible to provide a novel fθ lens for correcting the inclination of a reflecting face of the rotary polygon mirror and correcting chromatic aberration with respect to magnification.

The second object of the present invention can be achieved by a linear image forming lens in an optical scanner in which a light beam emitted from a semiconductor laser is changed to a parallel light beam by a collimator lens, the parallel light beam is formed by a first image forming optical system as a linear image extending in a main scan-corresponding direction, and the image formed parallel light beam is then deflected at an equal angular velocity by a rotary polygon mirror having a deflection reflecting face in the vicinity of the linear image so that the deflected light beam is formed as a light spot on a scanned face by a second image forming optical system having corrected chromatic aberration with respect to magnification in the main scan-corresponding direction to perform an optical scanning operation, the linear image forming lens being used as the first image forming optical system; the linear image forming lens comprising a first cylindrical lens having a convex cylindrical face on an object side of the linear image forming lens and having positive refracting power in a cross scan-corresponding direction; and a second cylindrical lens having a concave cylindrical face on the object side and having negative refracting power in the cross scan-corresponding direction; the first and second cylindrical lenses being sequentially arranged from the object side of the linear image forming lens to an image side thereof.

Abbe numbers $v_{d1}$ and $v_{d2}$ of the first and second cylindrical lenses on a line d may satisfy the following conditions.

$$53 < v_{d1} < 61 \quad \text{(2-I)}$$

$$20 < v_{d2} < 26 \quad \text{(2-II)}$$

In accordance with this structure, it is possible to provide a novel lens for forming a linear image in which the shift in position of the formed linear image is very small even when a luminous wavelength in the semiconductor laser is different from a designed wavelength.

Further objects and advantages of the present invention will be apparent from the following description of the preferred embodiments of the present invention as illustrated in the accompanying drawings.

BRIEF DESCRIPTION OF THE DRAWINGS

FIGS. 8a to 8e are diagrams respectively showing spherical aberration, field curvature caused in use of a spherical lens, fθ characteristics, comatic aberration, and field curvature caused in use of a rotary polygon mirror in a concrete Embodiment 2 of the fθ lens in the first embodiment of the present invention; and FIGS. 9a, 9b, 9c, 9d to 23a, 23b, 23c, 23d are diagrams respectively showing spherical aberrations, fθ characteristics, field curvatures caused at a rotating time of the rotary polygon mirror, and chromatic aberrations with respect to magnification in respective concrete Embodiments 9 to 23 of the fθ lens in the third embodiment of the present invention.

DESCRIPTION OF THE PREFERRED EMBODIMENTS

The preferred embodiments of an fθ lens and a linear image forming lens in the present invention will next be described in detail with reference to the accompanying drawings.

In the present invention, main and cross scan-corresponding directions will first be described.

In an optical scanner, when an optical path from a light source to a scanned face is linearly developed, an optical path between a rotary polygon mirror and the scanned face is set to an optical axis of the fθ lens.

A main scanning direction is perpendicular to the developed optical path on the scanned face. The main scan-corresponding direction is set to a direction perpendicular to the developed optical path and parallel to the main scanning direction. The cross scan-corresponding direction is set to a direction perpendicular to the developed optical path and perpendicular to the main scan-corresponding direction. The cross scan-corresponding direction is in conformity with a cross scanning direction on the scanned face.

In first and third embodiments of the present invention, a light beam emitted from a semiconductor laser is changed to a parallel light beam by a collimator lens in an optical scanner. The parallel light beam is formed by a first image forming optical system as a linear image extending in the main scan-corresponding direction. The light beam is then deflected at an equal angular velocity by a rotary polygon mirror having a deflection reflecting face in the vicinity of the linear image. Thus, the deflected light beam is formed as a light spot on a scanned face by a second image forming optical system to perform an optical scanning operation. An fθ lens in each of the first and third embodiments of the present invention is used as the second image forming optical system. The fθ lens has an fθ function with respect to the main scan-corresponding direction. The fθ lens also has a function for setting the scanned face and a deflecting start point on the deflection reflecting face in an approximately conjugate relation in geometrical optics with respect to the cross scan-corresponding direction.

Figure 1:
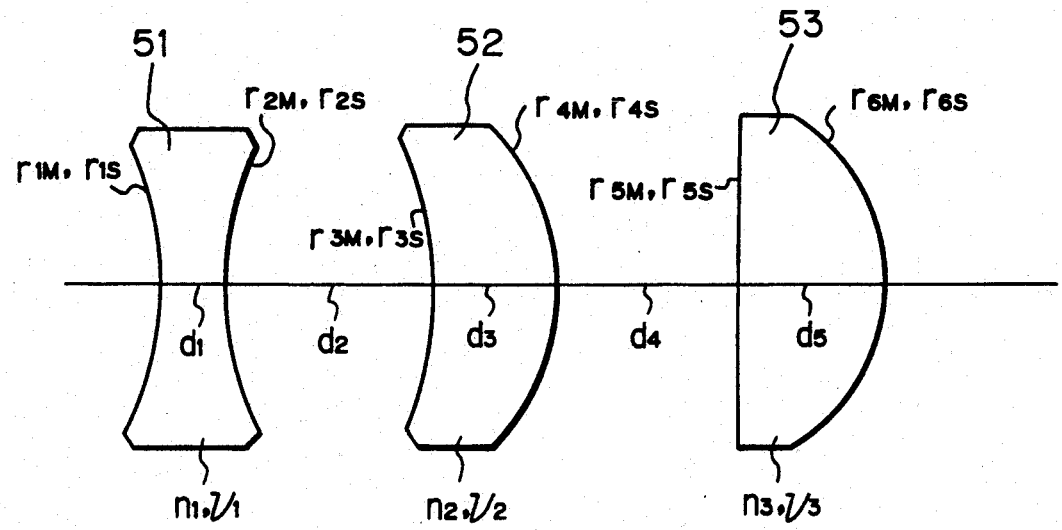
FIG. 1 is a view for explaining an fθ lens in a first embodiment of the present invention.

As shown in FIG. 1, the fθ lens in the first embodiment is constructed by first to third lens groups sequentially arranged from an object side of the fθ lens (on the left-hand side in FIG. 1) onto an image side thereof (on the right-hand side in FIG. 1).

The first to third lens groups are respectively constructed by first, second and third lenses 51, 52 and 53.

The first lens 51 has a concave spherical face on the object side and a cylindrical face having negative refracting power in the cross scan-corresponding direction (in a vertical direction in FIG. 1) on the image side.

The second lens 52 has a concave spherical face on the object side and a convex spherical face on the image side.

The third lens 53 has a flat face on the object side and a toric face on the image side on which refracting power of the toric face in the cross scan-corresponding direction is positive and stronger than positive refracting power of the toric face in the main scan-corresponding direction.

An Abbe number $\nu_{dj}$ of a j-th lens (j=1 to 3) counted from the object side on a line d, focal lengths $f_{jM}$ and $f_{jS}$ of the j-th lens in the main and cross scan-corresponding directions, and a combined focal length $f_M$ of an entire lens system in the main scan-corresponding direction satisfy the following conditions.

$$\nu_{d2} > 80 \qquad (1\text{-}I)$$

$$f_M \cdot \Sigma\{1/(f_{jM} \cdot \nu_{dj})\} > -0.03 \qquad (1\text{-}II)$$

$$f_{3S}/f_{1S} < -1.0 \qquad (1\text{-}III)$$

The sum in the condition (1-II) is done with respect to index j.

In a second embodiment of the present invention, a light beam emitted from a semiconductor laser is changed to a parallel light beam by a collimator lens in an optical scanner. The parallel light beam is formed by a first image forming optical system as a linear image extending in the main scan-corresponding direction. The light beam is then deflected at an equal angular velocity by a rotary polygon mirror having a deflection reflecting face in the vicinity of the linear image. Thus, the deflected light beam is formed as a light spot on a scanned face by a second image forming optical system having corrected chromatic aberration with respect to magnification in the main scanning direction to perform an optical scanning operation. A linear image forming lens in the second embodiment of the present invention is used as the first image forming optical system.

Figure 2:
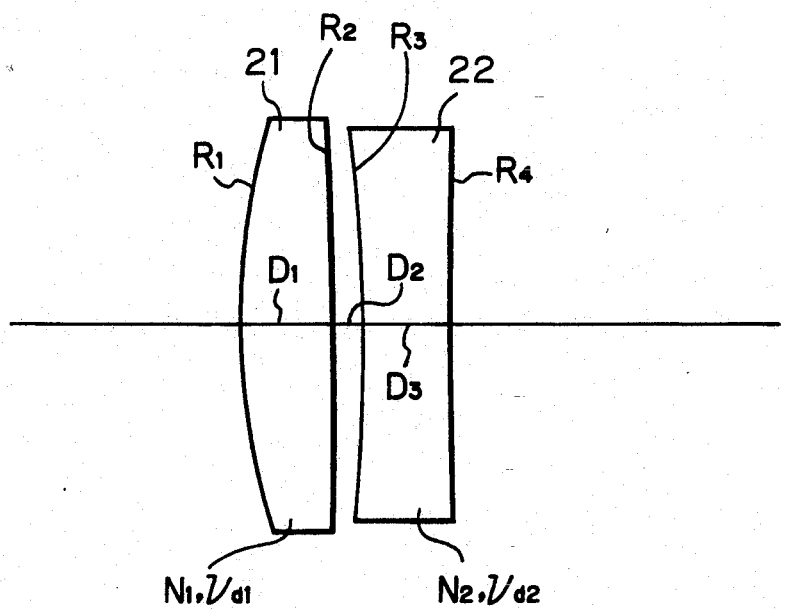
FIG. 2 is a view for explaining a linear image forming lens in a second embodiment of the present invention.

As shown in FIG. 2, the linear image forming lens is constructed by first and second cylindrical lenses 21 and 22 sequentially arranged from an object side of the linear image forming lens onto an image side thereof. The object side is a side of a light source (on the left-hand side in FIG. 2) and the image side is a side of the rotary polygon mirror (on the right-hand side in FIG. 2).

The first cylindrical lens 21 has a convex cylindrical face on the object side and has positive refracting power in the cross scan-corresponding direction (in a vertical direction in FIG. 2). The second cylindrical lens 22 has a concave cylindrical face on the object side and has negative refracting power in the cross scan-corresponding direction.

Abbe numbers $\nu_{d1}$ and $\nu_{d2}$ of the first and second cylindrical lenses on a line d satisfy the following conditions.

$$53 < \nu_{d1} < 61 \qquad (2\text{-}I)$$

$$20 < \nu_{d2} < 26 \qquad (2\text{-}II)$$

Figure 3:
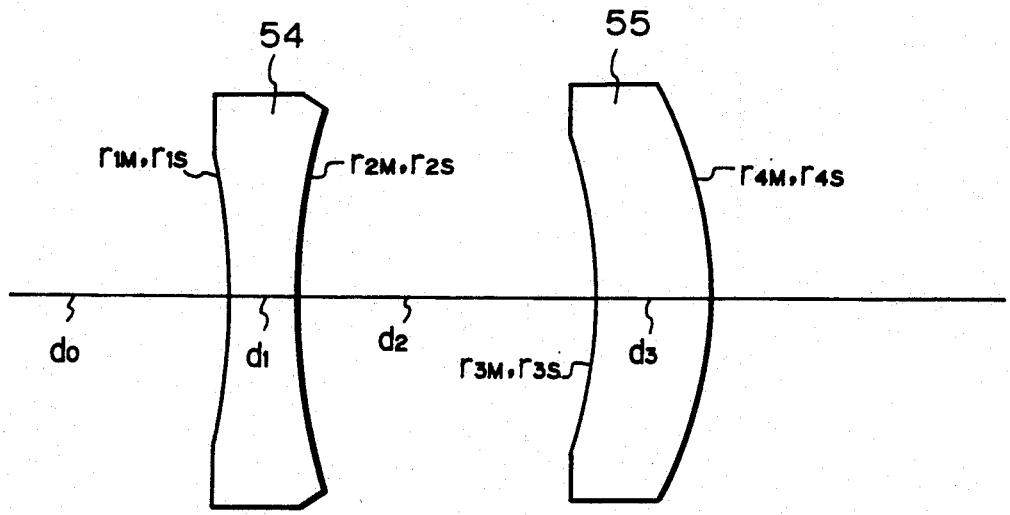
FIG. 3 is a view for explaining an fθ lens in a third embodiment of the present invention.

In the fθ lens in the third embodiment, as shown in FIG. 3, first and second lens groups are sequentially arranged from an object side of the fθ lens (on the left-hand side in FIG. 3) onto an image side thereof (on the right-hand side in FIG. 3).

The first and second lens groups are respectively constructed by first and second lenses 54 and 55.

The first lens 54 has a concave spherical face on the object side and a cylindrical face having negative refracting power in the cross scan-corresponding direction (in a vertical direction in FIG. 5) on the image side.

The second lens 55 has a cylindrical face having negative refracting power in the cross scan-corresponding direction on the object side. The second lens 55 also has a convex toric face on the image side on which positive refracting power of the toric face in the cross scan-corresponding direction is stronger than that in the main scan-corresponding direction.

An Abbe number $\nu_{dj}$ of a j-th lens (j=1 or 2) counted from the object side on a line d, a focal length $f_{jM}$ of the j-th lens in the main scan-corresponding direction, and a combined focal length $f_M$ of an entire lens system in the main scan-corresponding direction, a distance D between principal points of the first and second lenses, and a radius $r_{iS}$ of curvature of an i-th lens face (i=1 to 4) counted from the object side in the cross scan-corresponding direction satisfy the following conditions.

$$0 < f_M \cdot \Sigma\{1/(f_{jM} \cdot \nu_{dj})\} < 9 \times 10^{-3} \qquad (3\text{-}I)$$

$$\nu_{d1} < 40 \qquad (3\text{-}II)$$

$$\nu_{d2} < 50 \tag{3-III}$$

$$1.3 < f_M/f_{2M} < 1.5 \tag{3-IV}$$

$$0.14 < D/f_M < 0.21 \tag{3-V}$$

$$|r_{2S}/r_{3S}| = 1 \tag{3-VI}$$

The sum in the condition (3-I) is done with respect to index j.

The above conditions (1-I), (1-II) and (1-III) with respect to the fθ lens in the first embodiment will next be described.

The conditions (1-I) and (1-II) are conditions for achromatism.

When the semiconductor laser is used as a light source, a luminous wavelength of the semiconductor laser is changed about ±2 nm by the change in temperature thereof as mentioned above so that a wavelength band for performing an achromatic operation is very narrow.

When the above conditions (1-I) and (1-II) are satisfied, the chromatic aberration with respect to magnification is sufficiently corrected so that it is possible to perform the achromatic operation even in the above narrow wavelength band.

The condition (1-III) is a condition for preferably correcting field curvature in a cross scanning direction.

To perform an optical scanning operation of high density, it is important that no diameter of a light spot is changed in accordance with the height of an image. When the field curvature in the cross scanning direction is large, the diameter of the light spot is greatly changed in the cross scanning direction. However, the field curvature in the cross scanning direction is sufficiently corrected by satisfying the condition (1-III) so that the optical scanning operation of high density can be sufficiently performed.

The above conditions (3-I) to (3-VI) with respect to the fθ lens in the third embodiment will next be described.

The condition (3-I) is a condition for achromatism. When the condition (3-I) is satisfied, the chromatic aberration of the fθ lens with respect to magnification in the main scan-corresponding direction is sufficiently corrected so that the achromatic operation can be performed even in the narrow wavelength band such as 780±2 nm. This condition (3-I) is a condition for reducing the chromatic aberration with respect to magnification to a value less than $1.13 \times 10^{-5} f_M$ (μm/nm) when the height of an image is set to $0.58 f_M$. Concretely, when $f_M$ is equal to 264 mm, the chromatic aberration with respect to magnification can be reduced to a value less than 3 μm/nm.

The conditions (3-II) and (3-III) are also conditions for achromatism. When no conditions (3-I), (3-II) and (3-III) are satisfied, it is impossible to preferably perform the achromatic operation.

The condition (3-IV) is a condition for both achromatism and the correction of field curvature. When the ratio in the condition (3-IV) exceeds an upper limit thereof, the chromatic aberration with respect to magnification is increased. Further, the field curvature in the main scan-corresponding direction is excessively decreased. Thus, the diameter of a light spot in the main scan-corresponding direction is greatly changed in accordance with the image height. In contrast to this, when the ratio in the condition (3-IV) exceeds a lower limit thereof, the chromatic aberration with respect to magnification is increased. Further, the field curvature in the main scan-corresponding direction is excessively increased. Thus, the diameter of a light spot in the main scan-corresponding direction is greatly changed in accordance with the image height.

The condition (3-V) is a condition for both the correction of field curvature and fθ characteristics, i.e., the correction of distortion aberration. When the ratio in the condition (3-V) exceeds an upper limit thereof, the field curvature in the main scan-corresponding direction is excessively decreased and the fθ characteristics are changed in a decreasing direction. In contrast to this, when the ratio in the condition (3-V) exceeds a lower limit thereof, the field curvature in the main scan-corresponding direction is excessively increased and the fθ characteristics are changed in an increasing direction.

The condition (3-VI) is a condition for correcting the field curvature in the cross scan-corresponding direction. This condition means that second and third lens faces are constructed by the same concave cylindrical face. Therefore, when this condition (3-VI) is satisfied, it is possible to use the same jig for processing the second and fourth lens faces.

The operation of an optical scanner used in the present invention will next be described briefly.

Figure 4:
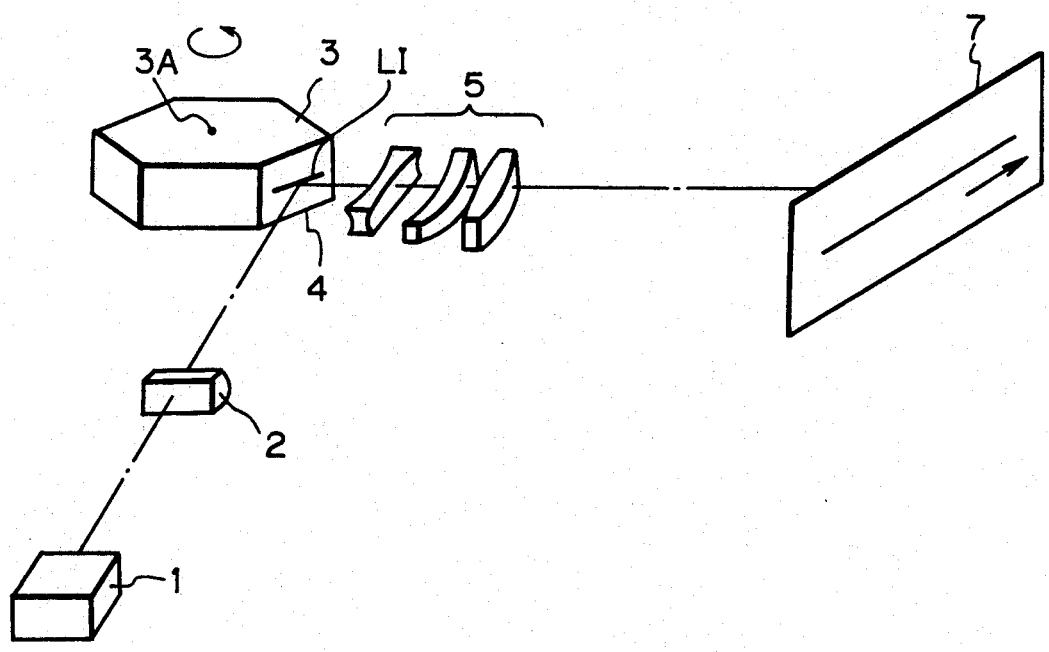
FIGS. 4 to 6 are views for explaining an optical scanner.

As shown in FIG. 4, a light source device 1 is composed of a semiconductor laser and a collimator lens and substantially emits a parallel light beam. This parallel light beam is formed by a first image forming optical system 2 as a linear image LI extending in a main scan-corresponding direction.

A rotary polygon mirror 3 has a deflection reflecting face 4 located in the vicinity of the linear image LI and reflecting the light beam from the first image forming optical system 2. When the rotary polygon mirror 3 is rotated around its rotational axis 3A at an equal speed, the reflected light beam is deflected at an equal angular velocity.

This deflected light beam is formed as a light spot on a scanned face 7 by an fθ lens 5 constituting a second image forming optical system, thereby optically scanning the scanned face 7 at an equal speed.

Figure 5:
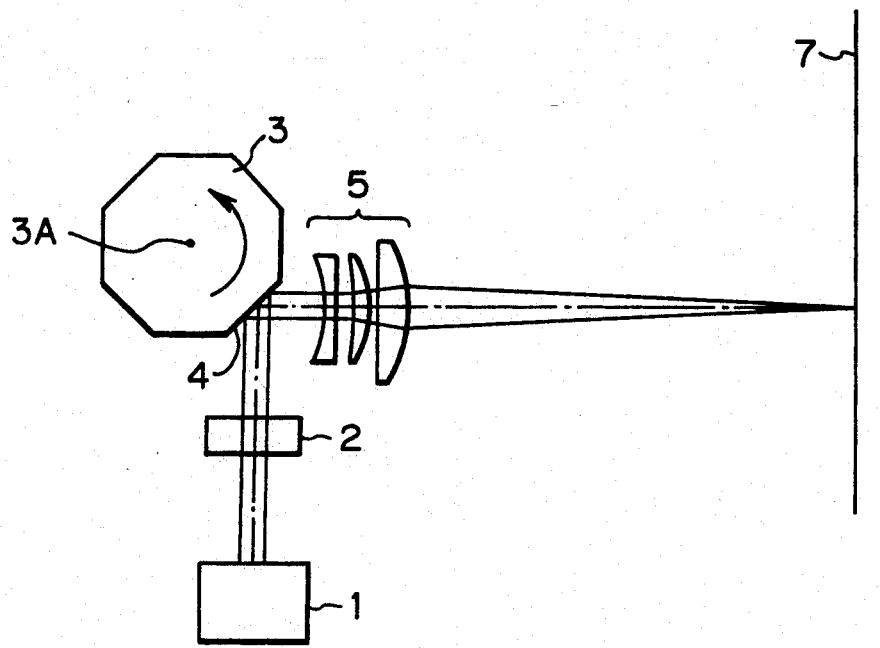

FIG. 5 shows an optical arrangement of the optical scanner shown in FIG. 4 and seen from the cross scan-corresponding direction. As shown in FIG. 5, the fθ lens 5 sets the position of the scanned face 7 and infinity on an object side in a conjugate relation in geometrical optics with respect to the main scan-corresponding direction (a vertical direction in FIG. 5).

Figure 6:
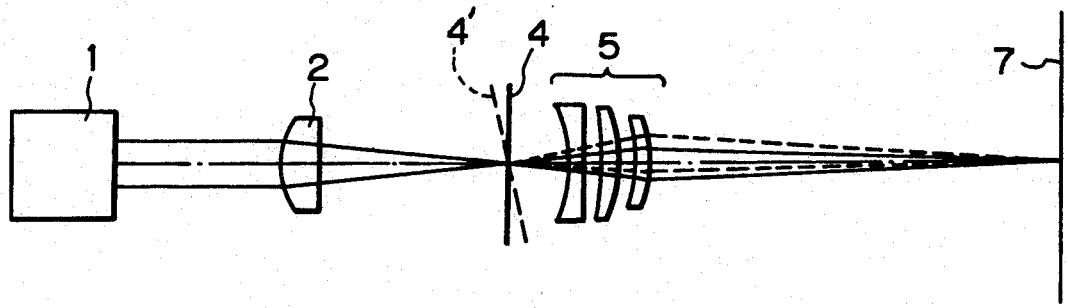
Figure 7C:
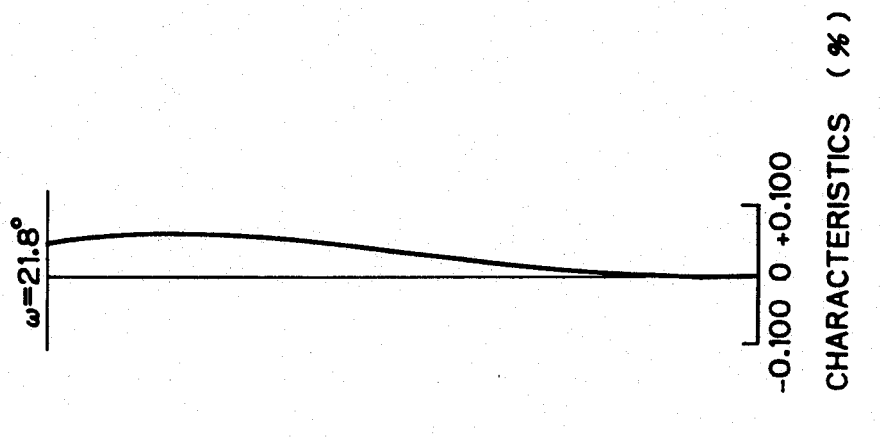
FIGS. 7a to 7e are diagrams respectively showing spherical aberration, field curvature caused in use of a spherical lens, fθ characteristics, comatic aberration, and field curvature caused in use of a rotary polygon mirror in a concrete Embodiment 1 of the fθ lens in the first embodiment of the present invention.
Figure 7B:
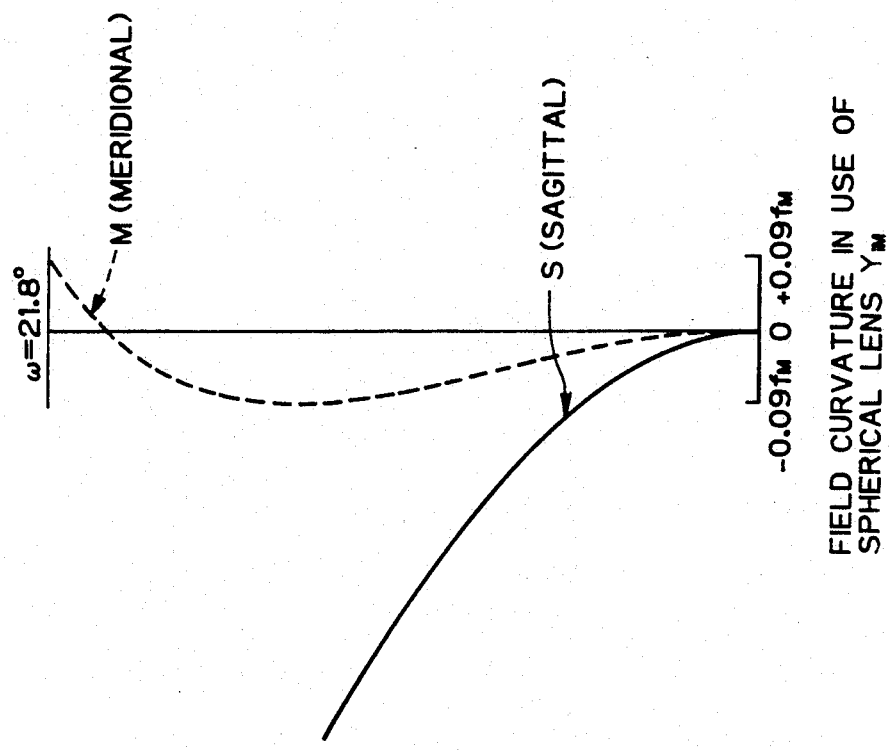
Figure 7A:
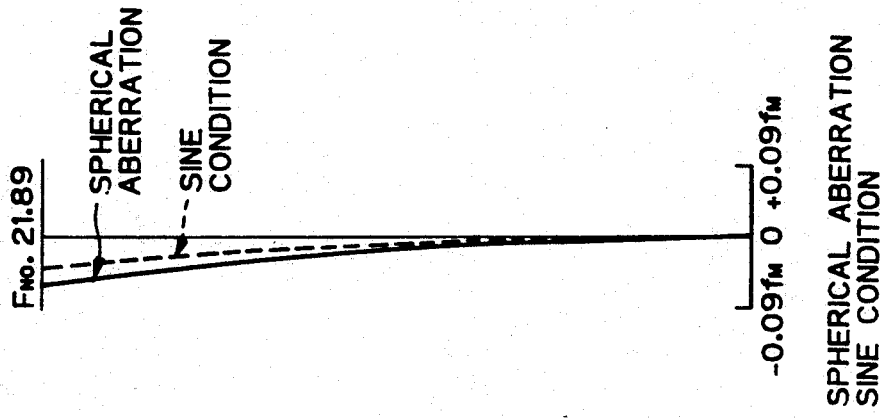
Figure 7E:
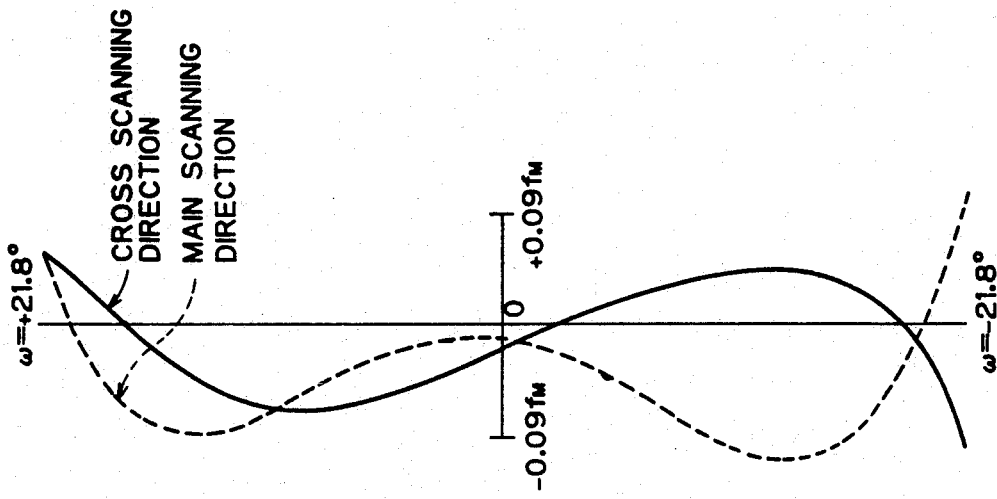
Figure 7D:
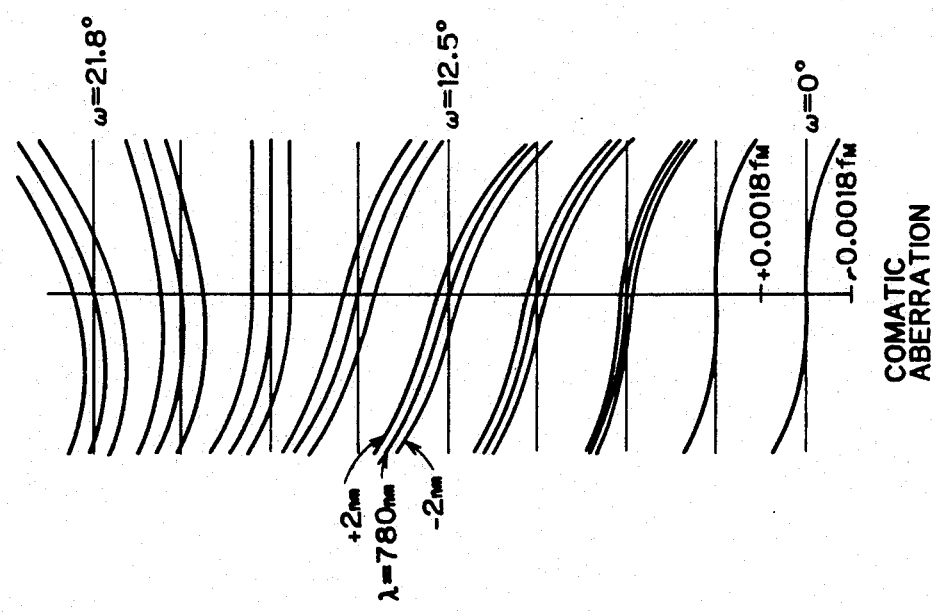
Figures 18A, 18B, 18C, 18D:
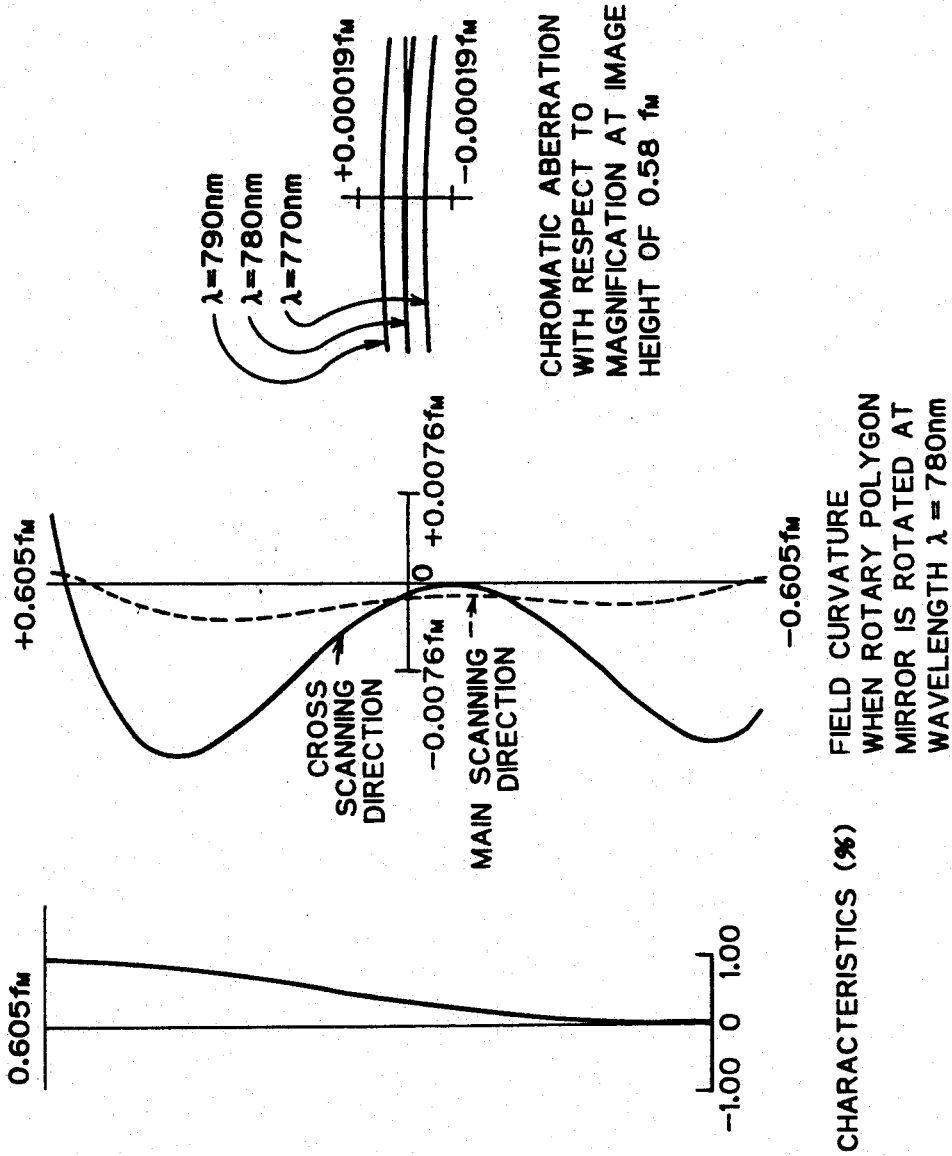

FIG. 6 is a view for developing the optical arrangement from the light source device 1 to the scanned face 7 along a developing optical path. In FIG. 6, the cross scan-corresponding direction corresponds to a vertical direction.

The fθ lens 5 sets the scanned face 7 and a deflecting start point on the deflection reflecting face 4 in an approximately conjugate relation in geometrical optics with respect to the cross scan-corresponding direction. Accordingly, as shown by reference numeral 4' in FIG. 6, no position of the formed light spot is changed in the cross scanning direction even when the deflection reflecting face 4 is inclined, thereby correcting the inclination of the deflection reflecting face.

When the rotary polygon mirror 3 is rotated around the rotational axis 3A, the distance between the linear image LI and the deflection reflecting face 4 is changed. Therefore, the position of the linear image LI on the deflection reflecting face 4 as a light source in the cross scanning direction is changed with respect to the fθ lens 5. This change in position of the linear image LI is set to $\Delta X$ and lateral magnification of the fθ lens 5 in the cross scanning direction is set to $\beta_S$. In this case, the position of an image formed by the fθ lens 5 in the cross scanning direction is changed by $\beta_S^2 \Delta X$ in the direction of an optical axis of the fθ lens by the change in position of the linear image. Accordingly, it is necessary to consider this change in position of the image formed by the fθ lens when the field curvature in the cross scanning direction is corrected.

When no chromatic aberration on an optical axis of the first image forming optical system 2 is corrected and a luminous wavelength is changed by the above-mentioned change in temperature, the change in position of the above linear image is provided as $\Delta X' (\neq \Delta X)$ by an influence of this chromatic aberration. Further, the shift in position of the formed image in the cross scan-corresponding direction is provided as $\beta'_S{}^2 \Delta X'$. In this case, the reference numeral $\beta'_S$ designates lateral magnification of the fθ lens in the cross scanning direction caused by the change in luminous wavelength. The lateral magnification $\beta'_S$ is approximately equal to the lateral magnification $\beta_S$. Since $\Delta X'$ is not equal to $\Delta X$, $\beta'_S{}^2 \Delta X'$ is not equal to $\beta_S{}^2 \Delta X$. Accordingly, when the field curvature in the cross scanning direction is corrected in consideration of only the change $\Delta X$, the field curvature in the cross scan-corresponding direction is changed when the luminous wavelength is changed. Therefore, the diameter of the light spot in the cross scanning direction is changed and cannot be neglected.

The conditions (2-I) and (2-II) with respect to the linear image forming lens in the second embodiment of the present invention will next be described.

When the Abbe number in the condition (2-I) exceeds a lower limit thereof, the chromatic aberration on an optical axis of the linear image forming lens is increased. In contrast to this, when the Abbe number in the condition (2-I) exceeds an upper limit thereof, the chromatic aberration on the optical axis of the linear image forming lens is improved. However, the radius of curvature of a convex face of the first cylindrical lens is reduced so that productivity of this first cylindrical lens is reduced.

When the Abbe number in the condition (2-II) exceeds an upper limit thereof, the chromatic aberration on the optical axis of the linear image forming lens is increased. In contrast to this, when the Abbe number in the condition (2-II) exceeds a lower limit thereof, there is no material for forming the second cylindrical lens.

Concrete Embodiments 1 to 23 of the present invention will next be described.

Concrete Embodiments 1 and 2 of the fθ lens in the first embodiment of the present invention will first be described.

In the concrete Embodiments 1 and 2, as shown in FIG. 1, reference numeral $r_{iM}$ designates a radius of curvature of an i-th lens face counted on the object side (on the side of the rotary polygon mirror) in the main scan-corresponding direction. Reference numeral $r_{iS}$ designates a radius of curvature of the i-th lens face in the cross scan-corresponding direction. Reference numeral $d_i$ designates a distance between i-th lens faces. When a lens face is constructed by a spherical or flat face, radii of curvature $r_i$, $r_{iS}$ and $r_{iM}$ are equal to each other.

Further, reference numeral $n_j$ designates a refractive index of a j-th lens (j=1 to 3) counted from the object side with respect to a wavelength of 780 nm. Reference numberal $\nu_{dj}$ designates an Abbe number of the j-th lens on line d. Reference numeral $f_M$ designates a combined focal length of the entire lens system in the main scan-corresponding direction and is normalized to 100. Further, reference numeral $2\omega$ designates an angle of view (unit: degree). Reference numeral $d_0$ designates a distance from the deflecting start point on the deflection reflecting face of the rotary polygon mirror to a first lens face of the fθ lens.

Embodiment 1

| $f_M = 100$, $F_{NO} = 1:21.89$, $2\omega = 43.6$, $d_o = 18.154$ | | | | | |
|---|---|---|---|---|---|
| i | $r_{iM}$ | $r_{iS}$ | $d_i$ | j | $n_j$ | $\nu_j$ |
| 1 | −23.284 | −23.384 | 1.979 | 1 | 1.58200 | 35.3 |
| 2 | ∞ | 20.496 | 1.942 | | | |
| 3 | −202.491 | −202.491 | 4.085 | 2 | 1.49282 | 81.61 |
| 4 | −30.19 | −30.19 | 1.616 | | | |
| 5 | ∞ | ∞ | 4.902 | 3 | 1.70400 | 53.85 |
| 6 | −45.022 | −13.597 | | | | |

Conditional values
$f_M \cdot \Sigma\{1/(f_{jM} \cdot \nu_{dj})\} = -0.0293$, $f_{3S}/f_{1S} = -1.04$ Embodiment 2

| $f_M = 100$, $F_{NO} = 1:21.89$, $2\omega = 43.4$, $d_o = 19.489$ | | | | | |
|---|---|---|---|---|---|
| i | $r_{iM}$ | $r_{iS}$ | $d_i$ | j | $n_j$ | $\nu_j$ |
| 1 | −22.737 | −22.737 | 2.364 | 1 | 1.58200 | 35.3 |
| 2 | ∞ | 25.795 | 1.913 | | | |
| 3 | −442.102 | −442.102 | 4.06 | 2 | 1.49282 | 81.61 |
| 4 | −27.067 | −27.067 | 1.011 | | | |
| 5 | ∞ | ∞ | 4.872 | 3 | 1.70400 | 53.85 |
| 6 | −53.052 | −14.634 | | | | |

Conditional values
$f_M \cdot \Sigma\{1/(f_{jM} \cdot \nu_{dj})\} = -0.0268$, $f_{3S}/f_{1S} = -1.02$ FIGS. 7a to 7e are diagrams respectively showing spherical aberration, field curvature caused in use of a spherical lens $Y_{iM}$, fθ characteristics, comatic aberration, and field curvature caused in use of the rotary polygon mirror in the concrete Embodiment 1. FIGS. 8a to 8e are diagrams respectively showing spherical aberration, field curvature caused in use of a spherical lens $Y_{iM}$, fθ characteristics, comatic aberration, and field curvature caused in use of the rotary polygon mirror in the concrete Embodiment 2.

The diagrams of the field curvature with respect to a half angle of view are shown for comparison. This field curvature is caused when all the first to third lenses are constructed by spherical lenses having the radius $r_{iM}$ of curvature in the main scanning direction.

Concrete Embodiments 3 to 8 of the linear image forming lens in the second embodiment of the present invention will next be described.

In these concrete Embodiments 3 to 8, as shown in FIG. 2, reference numeral $R_i$ designates a radius of curvature of an i-th lens face counted on the object side in the cross scan-corresponding direction. All the i-th lens faces are constructed by cylindrical or flat faces. Reference numeral $D_i$ designates a distance between i-th lens faces. Further, reference numeral $N_j$ designates a refractive index of a j-th lens (j=1 or 2) counted from the object side. Reference numeral $\nu_{dj}$ designates an Abbe number of the j-th lens on line d. In the Embodiments 3 to 8, a combined focal length f of the lens system in the cross scan-corresponding direction is set to 145 mm.

Embodiment 3

| i | $R_i$ | $D_i$ | j | $N_j$ | $v_{dj}$ |
|---|---|---|---|---|---|
| 1 | 54.5 | 5.0 | 1 | 1.63261 | 60.1 |
| 2 | ∞ | 1.7 | | | |
| 3 | −165.412 | 5.0 | 2 | 1.82485 | 23.8 |
| 4 | ∞ | | | | |

Embodiment 4

| i | $R_i$ | $D_i$ | j | $N_j$ | $v_{dj}$ |
|---|---|---|---|---|---|
| 1 | 66.0 | 5.0 | 1 | 1.704 | 53.9 |
| 2 | ∞ | 1.7 | | | |
| 3 | −198.085 | 5.0 | 2 | 1.78564 | 25.5 |
| 4 | ∞ | | | | |

Embodiment 5

| i | $R_i$ | $D_i$ | j | $N_j$ | $v_{dj}$ |
|---|---|---|---|---|---|
| 1 | 60.0 | 5.0 | 1 | 1.66959 | 55.3 |
| 2 | ∞ | 1.7 | | | |
| 3 | −183.341 | 5.0 | 2 | 1.82485 | 23.8 |
| 4 | ∞ | | | | |

Embodiment 6

| i | $R_i$ | $D_i$ | j | $N_j$ | $v_{dj}$ |
|---|---|---|---|---|---|
| 1 | 51.0 | 5.0 | 1 | 1.61339 | 60.3 |
| 2 | ∞ | 1.7 | | | |
| 3 | −151.488 | 5.0 | 2 | 1.82485 | 23.8 |
| 4 | ∞ | | | | |

Embodiment 7

| i | $R_i$ | $D_i$ | j | $N_j$ | $v_{dj}$ |
|---|---|---|---|---|---|
| 1 | 62.0 | 5.0 | 1 | 1.68240 | 54.8 |
| 2 | ∞ | 1.7 | | | |
| 3 | −190.378 | 5.0 | 2 | 1.82485 | 23.8 |
| 4 | ∞ | | | | |

Embodiment 8

| i | $R_i$ | $D_i$ | j | $N_j$ | $v_{dj}$ |
|---|---|---|---|---|---|
| 1 | 54.5 | 5.0 | 1 | 1.63268 | 60.2 |
| 2 | ∞ | 1.7 | | | |
| 3 | −165.366 | 5.0 | 2 | 1.82485 | 23.8 |
| 4 | ∞ | | | | |

The chromatic aberration on the optical axis of the linear image forming lens in each of the Embodiments 3 to 8 is shown in the following table.

TABLE

| Embodiment number | chromatic aberration on optical axis | |
|---|---|---|
| | luminous wavelength 770 nm | luminous wavelength 790 nm |
| 3 | −0.021 | +0.022 |
| 4 | −0.038 | +0.039 |
| 5 | −0.026 | +0.027 |
| 6 | −0.013 | +0.018 |
| 7 | −0.032 | +0.030 |

TABLE -continued

| Embodiment number | chromatic aberration on optical axis | |
|---|---|---|
| | luminous wavelength 770 nm | luminous wavelength 790 nm |
| 8 | −0.018 | +0.018 |

In this table, a designed value of the luminous wavelength of the semiconductor laser in the light source device is set to 780 nm. When this luminous wavelength is changed by ±10 nm and is therefore set to 770 nm and 790 nm, the change in position of the formed linear image is provided as the chromatic aberration on the optical axis of the linear image forming lens.

In the respective Embodiments, the change in position of the formed linear image caused by the change in luminous wavelength is very small. In particular, the change in position of the formed linear image is of the order of 1/1000 with respect to the change in luminous wavelength of about ±2 nm caused by the change in temperature of the semiconductor laser so that the change in position of the formed linear image can be substantially neglected.

Concrete Embodiments 9 to 23 of the $f\theta$ lens in the third embodiment of the present invention will next be described.

Similar to the case of the $f\theta$ lens in the first embodiment, in the respective Embodiments 9 to 23, reference numeral $f_M$ designates a combined focal length of the $f\theta$ lens in the main scan-corresponding direction and is normalized to 100. Reference numeral $f_{jM}$ designates a focal length of a j-th lens counted from the object side in the main scan-corresponding direction. Reference numeral D designates a distance between principal points of the first and second lenses.

As shown in FIG. 3, reference numeral $r_{iM}$ designates a radius of curvature of an i-th lens face counted on the side of the rotary polygon mirror in the main scan-corresponding direction. Reference numeral $r_{iS}$ designates a radius of curvature of this i-th lens face in the cross scan-corresponding direction. Reference numeral $d_i$ designates a distance between the i-th lens face and an (i+1)-th lens face. Reference numeral $d_0$ designates a distance from the deflection reflecting face of the rotary polygon mirror to a first lens face. Reference numeral $n_j$ designates a refractive index of a j-th lens with respect to a wavelength of 780 nm. Reference numeral $v_j$ designates an Abbe number of the j-th lens on line d.

Embodiment 9

$f_M = 100$, $f_M \cdot \Sigma \{1/(f_{jM} \cdot v_{dj})\} = 5.05 \times 10^{-4}$,
$f_M/f_{2M} = 1.394$, $D/f_M = 0.194$, $d_o = 6.013$

| i | $r_{iM}$ | $r_{iS}$ | $d_i$ | j | $n_j$ | $v_j$ |
|---|---|---|---|---|---|---|
| 1 | −145.551 | −145.551 | 5.673 | 1 | 1.78564 | 25.5 |
| 2 | ∞ | 66.180 | 11.761 | | | |
| 3 | ∞ | −66.180 | 6.807 | 2 | 1.51118 | 64.2 |
| 4 | −36.682 | −9.289 | | | | |

Embodiment 10

$f_M = 100$, $f_M \cdot \Sigma \{1/(f_{jM} \cdot v_{dj})\} = 1.15 \times 10^{-3}$,
$f_M/f_{2M} = 1.390$, $D/f_M = 0.191$, $d_o = 6.013$

| i | $r_{iM}$ | $r_{iS}$ | $d_i$ | j | $n_j$ | $v_j$ |
|---|---|---|---|---|---|---|
| 1 | −147.835 | −147.835 | 5.673 | 1 | 1.78564 | 25.5 |
| 2 | ∞ | 56.347 | 11.610 | | | |
| 3 | ∞ | −56.347 | 6.807 | 2 | 1.56246 | 63.1 |

-continued

| | $f_M = 100, f_M \cdot \Sigma \{1/(f_{jM} \cdot \nu_{dj})\} = 1.15 \times 10^{-3}$, $f_M/f_{2M} = 1.390, D/f_M = 0.191, d_o = 6.013$ | | | | | |
|---|---|---|---|---|---|---|
| i | $r_{iM}$ | $r_{iS}$ | $d_i$ | j | $n_j$ | $\nu_j$ |
| 4 | −40.464 | −9.823 | | | | |

Embodiment 11

| | $f_M = 100, f_M \cdot \Sigma \{1/(f_{jM} \cdot \nu_{dj})\} = 1.96 \times 10^{-3}$, $f_M/f_{2M} = 1.390, D/f_M = 0.191, d_o = 6.013$ | | | | | |
|---|---|---|---|---|---|---|
| i | $r_{iM}$ | $r_{iS}$ | $d_i$ | j | $n_j$ | $\nu_j$ |
| 1 | −149.074 | −149.074 | 5.673 | 1 | 1.78564 | 25.5 |
| 2 | ∞ | 53.322 | 11.572 | | | |
| 3 | ∞ | −53.322 | 6.807 | 2 | 1.58251 | 61.2 |
| 4 | −41.977 | −10.021 | | | | |

Embodiment 12

| | $f_M = 100, f_M \cdot \Sigma \{1/(f_{jM} \cdot \nu_{dj})\} = 6.83 \times 10^{-3}$, $f_M/f_{2M} = 1.388, D/f_M = 0.190, d_o = 6.013$ | | | | | |
|---|---|---|---|---|---|---|
| i | $r_{iM}$ | $r_{iS}$ | $d_i$ | j | $n_j$ | $\nu_j$ |
| 1 | −150.059 | −150.059 | 5.673 | 1 | 1.79070 | 33.3 |
| 2 | ∞ | 53.322 | 11.572 | | | |
| 3 | ∞ | −53.322 | 6.807 | 2 | 1.58251 | 61.2 |
| 4 | −41.977 | −10.018 | | | | |

Embodiment 13

| | $f_M = 100, f_M \cdot \Sigma \{1/(f_{jM} \cdot \nu_{dj})\} = 8.59 \times 10^{-3}$, $f_M/f_{2M} = 1.388, D/f_M = 0.189, d_o = 6.013$ | | | | | |
|---|---|---|---|---|---|---|
| i | $r_{iM}$ | $r_{iS}$ | $d_i$ | j | $n_j$ | $\nu_j$ |
| 1 | −155.916 | −155.916 | 5.673 | 1 | 1.81961 | 37.35 |
| 2 | ∞ | 52.566 | 11.496 | | | |
| 3 | ∞ | −52.566 | 6.807 | 2 | 1.58251 | 61.2 |
| 4 | −41.977 | −9.954 | | | | |

Embodiment 14

| | $f_M = 100, f_M \cdot \Sigma \{1/(f_{jM} \cdot \nu_{dj})\} = 2.35 \times 10^{-3}$, $f_M/f_{2M} = 1.383, D/f_M = 0.190, d_o = 6.013$ | | | | | |
|---|---|---|---|---|---|---|
| i | $r_{iM}$ | $r_{iS}$ | $d_i$ | j | $n_j$ | $\nu_j$ |
| 1 | −151.089 | −151.089 | 5.673 | 1 | 1.78564 | 25.5 |
| 2 | ∞ | 51.431 | 11.572 | | | |
| 3 | ∞ | −51.431 | 6.807 | 2 | 1.59633 | 60.7 |
| 4 | −43.111 | −10.159 | | | | |

Embodiment 15

| | $f_M = 100, f_M \cdot \Sigma \{1/(f_{jM} \cdot \nu_{dj})\} = 3.98 \times 10^{-3}$, $f_M/f_{2M} = 1.389, D/f_M = 0.191, d_o = 6.013$ | | | | | |
|---|---|---|---|---|---|---|
| i | $r_{iM}$ | $r_{iS}$ | $d_i$ | j | $n_j$ | $\nu_j$ |
| 1 | −148.359 | −148.359 | 5.673 | 1 | 1.78564 | 25.5 |
| 2 | ∞ | 55.969 | 11.610 | | | |
| 3 | ∞ | −55.969 | 6.807 | 2 | 1.56195 | 56.0 |
| 4 | −40.464 | −9.807 | | | | |

Embodiment 16

| | $f_M = 100, f_M \cdot \Sigma \{1/(f_{jM} \cdot \nu_{dj})\} = 1.93 \times 10^{-3}$, $f_M/f_{2M} = 1.391, D/f_M = 0.192, d_o = 6.013$ | | | | | |
|---|---|---|---|---|---|---|
| i | $r_{iM}$ | $r_{iS}$ | $d_i$ | j | $n_j$ | $\nu_j$ |
| 1 | −147.392 | −147.392 | 5.673 | 1 | 1.78564 | 25.5 |
| 2 | ∞ | 57.104 | 11.648 | | | |
| 3 | ∞ | −57.104 | 6.807 | 2 | 1.55749 | 60.8 |

-continued

| | $f_M = 100, f_M \cdot \Sigma \{1/(f_{jM} \cdot \nu_{dj})\} = 1.93 \times 10^{-3}$, $f_M/f_{2M} = 1.391, D/f_M = 0.192, d_o = 6.013$ | | | | | |
|---|---|---|---|---|---|---|
| i | $r_{iM}$ | $r_{iS}$ | $d_i$ | j | $n_j$ | $\nu_j$ |
| 4 | −40.086 | −9.780 | | | | |

Embodiment 17

| | $f_M = 100, f_M \cdot \Sigma \{1/(f_{jM} \cdot \nu_{dj})\} = 2.5 \times 10^{-3}$, $f_M/f_{2M} = 1.394, D/f_M = 0.197, d_o = 6.013$ | | | | | |
|---|---|---|---|---|---|---|
| i | $r_{iM}$ | $r_{iS}$ | $d_i$ | j | $n_j$ | $\nu_j$ |
| 1 | −131.222 | −131.222 | 5.673 | 1 | 1.71221 | 28.3 |
| 2 | ∞ | 66.936 | 11.912 | | | |
| 3 | ∞ | −66.936 | 6.807 | 2 | 1.51118 | 64.2 |
| 4 | −36.682 | −9.394 | | | | |

Embodiment 18

| | $f_M = 100, f_M \cdot \Sigma \{1/(f_{jM} \cdot \nu_{dj})\} = 5.58 \times 10^{-4}$, $f_M/f_{2M} = 1.388, D/f_M = 0.189, d_o = 6.013$ | | | | | |
|---|---|---|---|---|---|---|
| i | $r_{iM}$ | $r_{iS}$ | $d_i$ | j | $n_j$ | $\nu_j$ |
| 1 | −156.939 | −156.939 | 5.673 | 1 | 1.82485 | 23.8 |
| 2 | ∞ | 52.566 | 11.496 | | | |
| 3 | ∞ | −52.566 | 6.807 | 2 | 1.58251 | 61.24 |
| 4 | −41.977 | −9.950 | | | | |

Embodiment 19

| | $f_M = 100, f_M \cdot \Sigma \{1/(f_{jM} \cdot \nu_{dj})\} = 3.79 \times 10^{-3}$, $f_M/f_{2M} = 1.365, D/f_M = 0.192, d_o = 6.013$ | | | | | |
|---|---|---|---|---|---|---|
| i | $r_{iM}$ | $r_{iS}$ | $d_i$ | j | $n_j$ | $\nu_j$ |
| 1 | −143.925 | −143.925 | 5.673 | 1 | 1.71221 | 28.3 |
| 2 | ∞ | 62.398 | 11.345 | | | |
| 3 | ∞ | −62.398 | 6.807 | 2 | 1.51118 | 64.2 |
| 4 | −37.439 | −9.156 | | | | |

Embodiment 20

| | $f_M = 100, f_M \cdot \Sigma \{1/(f_{jM} \cdot \nu_{dj})\} = 3.97 \times 10^{-3}$, $f_M/f_{2M} = 1.456, D/f_M = 0.19, d_o = 6.013$ | | | | | |
|---|---|---|---|---|---|---|
| i | $r_{iM}$ | $r_{iS}$ | $d_i$ | j | $n_j$ | $\nu_j$ |
| 1 | −112.962 | −112.962 | 5.673 | 1 | 1.71221 | 28.3 |
| 2 | ∞ | 48.406 | 11.685 | | | |
| 3 | ∞ | −48.406 | 6.807 | 2 | 1.68818 | 55.5 |
| 4 | −47.271 | −11.395 | | | | |

Embodiment 21

| | $f_M = 100, f_M \cdot \Sigma \{1/(f_{jM} \cdot \nu_{dj})\} = 4.23 \times 10^{-3}$, $f_M/f_{2M} = 1.468, D/f_M = 0.179, d_o = 6.013$ | | | | | |
|---|---|---|---|---|---|---|
| i | $r_{iM}$ | $r_{iS}$ | $d_i$ | j | $n_j$ | $\nu_j$ |
| 1 | −112.321 | −112.321 | 5.673 | 1 | 1.71221 | 28.3 |
| 2 | ∞ | 45.380 | 10.551 | | | |
| 3 | ∞ | −45.380 | 6.807 | 2 | 1.68818 | 55.5 |
| 4 | −56.893 | −10.912 | | | | |

Embodiment 22

| | $f_M = 100, f_M \cdot \Sigma \{1/(f_{jM} \cdot \nu_{dj})\} = 3.73 \times 10^{-3}$, $f_M/f_{2M} = 1.492, D/f_M = 1.168, d_o = 6.013$ | | | | | |
|---|---|---|---|---|---|---|
| i | $r_{iM}$ | $r_{iS}$ | $d_i$ | j | $n_j$ | $\nu_j$ |
| 1 | −108.652 | −108.652 | 5.673 | 1 | 1.71221 | 28.3 |
| 2 | ∞ | 42.355 | 9.416 | | | |
| 3 | ∞ | −42.355 | 6.807 | 2 | 1.68818 | 55.5 |

-continued $f_M = 100, f_M \cdot \Sigma \{1/(f_{jM} \cdot \nu_{dj})\} = 3.73 \times 10^{-3},$
$f_M/f_{2M} = 1.492, D/f_M = 1.168, d_o = 6.013$

| i | $r_{iM}$ | $r_{iS}$ | $d_i$ | j | $n_j$ | $\nu_j$ |
|---|----------|----------|-------|---|-------|---------|
| 4 | −46.137  | −10.424  |       |   |       |         |

Embodiment 23

$f_M = 100, f_M \cdot \Sigma \{1/(f_{jM} \cdot \nu_{dj})\} = 3.42 \times 10^{-3},$
$f_M/f_{2M} = 1.516, D/f_M = 0.156, d_o = 6.013$

| i | $r_{iM}$ | $r_{iS}$ | $d_i$ | j | $n_j$ | $\nu_j$ |
|---|----------|----------|-------|---|---------|------|
| 1 | −105.220 | −105.220 | 5.673 | 1 | 1.71221 | 28.3 |
| 2 | ∞        | 40.086   | 8.282 |   |         |      |
| 3 | ∞        | −40.086  | 6.807 | 2 | 1.68818 | 55.5 |
| 4 | −45.380  | −9.959   |       |   |         |      |

FIGS. 9a, 9b, 9c, 9d to 23a, 23b, 23c, 23d are diagrams respectively showing spherical aberrations, fθ characteristics, field curvatures, and chromatic aberrations with respect to magnification in the respective concrete Embodiments 9 to 23. In each of FIGS. 9a to 23a showing spherical aberrations, the spherical aberration is shown by a solid line and a sine condition is shown by a broken line. In each of FIGS. 9c to 23c showing field curvatures, the field curvature is caused by the rotation of the rotary polygon mirror and the field curvatures in the main and cross scanning directions are respectively shown by broken and solid lines with respect to an used wavelength of 780 nm.

In each of FIGS. 9d to 23d showing chromatic aberrations, the chromatic aberration with respect to magnification is provided as comatic aberration in the case of an image height of 0.58 $f_M$. A central wavelength is set to 780 nm and the chromatic aberration with respect to magnification is also provided in the case of each of wavelengths of 790 nm and 770 nm. In the respective Emodiments, the above aberrations are preferably provided and the field curvature is very preferably corrected in each of the main scan-corresponding direction and the cross scan-corresponding direction. Further, the fθ characteristics are also preferably provided and the chromatic aberration with respect to magnification is preferably corrected.

As mentioned above, in accordance with the novel fθ lens in the present invention constructed as above, an optical scanning operation can be performed by preferably correcting the field curvatures in the main and cross scan-corresponding directions while the inclination of a reflecting face of the rotary polygon mirror is preferably corrected. Further, since an achromatic operation is preferably performed, it is possible to preferably perform the optical scanning operation without causing any jitter even when an oscillation wavelength is changed by a mode hop in the semiconductor laser as a light source.

In the linear image forming lens in the present invention, the change in position of a formed linear image caused by the change in luminous wavelength of the semiconductor laser is effectively restricted as mentioned above. Further, it is possible to preferably perform an optical scanning operation of high density by using the fθ lens as a second image forming optical system for correcting the chromatic aberration with respect to magnification.

Many widely different embodiments of the present invention may be constructed without departing from the spirit and scope of the present invention. It should be understood that the present invention is not limited to the specific embodiment described in the specification, except as defined in the appended claims.

What is claimed is:

1. An fθ lens in an optical scanner in which a light beam emitted from a semiconductor laser is changed to a parallel light beam by a collimator lens, the parallel light beam is formed by a first image forming optical system as a linear image extending in a main scan-corresponding direction, and the image-formed parallel light beam is then deflected by a rotary polygon mirror having a deflection reflecting face in the vicinity of said linear image so that the deflected light beam is formed as a light spot on a scanned face by a second image forming optical system to perform an optical scanning operation, said fθ lens being used as said second image forming optical system;

said fθ lens having an fθ function with respect to the main scan-corresponding direction and a function for setting the scanned face and a deflecting start point on the deflection reflecting face in an approximately conjugate relation in geometrical optics with respect to a cross scan-corresponding direction;

said fθ lens comprising a first lens group having negative refracting power in a main scan-corresponding direction, and a second lens group having positive refracting powers in both the main and cross scan-corresponding directions, said second lens group comprising a lens having different refracting powers in the main scan-corresponding direction and the cross scan-corresponding direction, said first lens group and said second lens group being sequentially arranged from an object side of said fθ lens to an image side of said fθ lens, said first lens group comprising only one lens made of glass and said second lens group comprising only one lens made of glass;

an Abbe number of said one lens belonging to said first lens group and having said negative refracting power in the main scan-corresponding direction being less than an Abbe number of said one lens belonging to said second lens group and having said positive refracting powers in both the main and cross scan-corresponding directions.

2. An fθ lens in an optical scanner according to claim 1, in which said one lens of said first lens group comprises a concave spherical face on said object side of said fθ lens and a cylindrical face having negative refracting power in said cross scan-corresponding direction on said image side of said fθ lens;

said lens of said second lens group comprises a cylindrical face having negative refracting power in said cross scan-corresponding direction on said object side and a convex toric face on said image side on which positive refracting power of a toric face in said cross scan-corresponding direction is stronger than that in said main scan-corresponding direction, said lens of said second lens group having an Abbe number greater than that of said lens of said first lens group; and an Abbe number $\nu_{dj}$ of a j-th lens counted from said object side of said fθ lens on a line d, a focal length $f_{jM}$ of the j-th lens in said main scan-corresponding direction, and a combined focal length $f_M$ of an entire lens system in said main scan-corresponding direction, a distance D between said first and second lenses, and radius of curvature $r_{iS}$ of an i-th lens face counted from said object side of said $f\theta$ lens in said cross scan-corresponding direction satisfy the following conditions, $$o < f_M \cdot \sum_{j=1}^{2} \{1/(f_{jM} \cdot \nu_{dj})\} < 9 \times 10^{-3} \quad \text{(3-I)}$$

$$\nu_{d1} < 40 \quad \text{(3-II)}$$

$$\nu_{d2} > 50 \quad \text{(3-III)}$$

$$1.3 < f_M/f_{2M} < 1.5 \quad \text{(3-IV)}$$

$$0.14 < D/f_M < 0.21 \quad \text{(3-V)}$$

$$|r_{2S}/r_{3S}| = 1 \quad \text{(3-VI)}.$$

* * * * *